(12) United States Patent
Malenovsky

(10) Patent No.: US 12,062,381 B2
(45) Date of Patent: Aug. 13, 2024

(54) METHOD AND DEVICE FOR SPEECH/MUSIC CLASSIFICATION AND CORE ENCODER SELECTION IN A SOUND CODEC

(71) Applicant: VOICEAGE CORPORATION, Town of Mount Royal (CA)

(72) Inventor: Vladimir Malenovsky, Brno (CZ)

(73) Assignee: VOICEAGE CORPORATION, Town of Mount Royal (CA)

( * ) Notice: Subject to any disclaimer, the term of this patent is extended or adjusted under 35 U.S.C. 154(b) by 0 days.

(21) Appl. No.: 17/995,081

(22) PCT Filed: Apr. 8, 2021

(86) PCT No.: PCT/CA2021/050465
§ 371 (c)(1),
(2) Date: Sep. 29, 2022

(87) PCT Pub. No.: WO2021/207825
PCT Pub. Date: Oct. 21, 2021

(65) Prior Publication Data
US 2023/0215448 A1    Jul. 6, 2023

Related U.S. Application Data

(60) Provisional application No. 63/010,798, filed on Apr. 16, 2020.

(51) Int. Cl.
*G10L 19/22*    (2013.01)
*G10L 15/02*    (2006.01)
(Continued)

(52) U.S. Cl.
CPC .............. *G10L 19/22* (2013.01); *G10L 15/02* (2013.01); *G10L 19/008* (2013.01); *G10L 19/12* (2013.01);
(Continued)

(58) Field of Classification Search
CPC ....... G10L 19/22; G10L 15/02; G10L 19/008; G10L 19/12; G10L 19/20; G10L 25/18;
(Continued)

(56) References Cited

U.S. PATENT DOCUMENTS 9,015,038 B2    4/2015    Vaillancourt et al.
9,196,249 B1 *  11/2015   Konchitsky ............. G10L 25/81
(Continued)

FOREIGN PATENT DOCUMENTS

WO    2017/049397 A1    3/2017

OTHER PUBLICATIONS

Panagiotakis, Costas, and Georgios Tziritas. "A speech/music discriminator based on RMS and zero-crossings." IEEE Transactions on multimedia 7.1 (2005): 155-166. (Year: 2005).*
(Continued)

*Primary Examiner* — Douglas Godbold
(74) *Attorney, Agent, or Firm* — Fay Kaplun & Marcin, LLP

(57) ABSTRACT

Two-stage speech/music classification device and method classify an input sound signal and select a core encoder for encoding the sound signal. A first stage classifies the input sound signal into one of a number of final classes. A second stage extracts high-level features of the input sound signal and selects the core encoder for encoding the input sound signal in response to the extracted high-level features and the final class selected in the first stage.

53 Claims, 15 Drawing Sheets

(51) Int. Cl.
*G10L 19/008* (2013.01)
*G10L 19/12* (2013.01)
*G10L 19/20* (2013.01)
*G10L 25/18* (2013.01)
*G10L 25/21* (2013.01)
*G10L 25/81* (2013.01)
*G10L 25/84* (2013.01)
*G10L 25/90* (2013.01)

(52) U.S. Cl.
CPC .............. *G10L 19/20* (2013.01); *G10L 25/18* (2013.01); *G10L 25/21* (2013.01); *G10L 25/81* (2013.01); *G10L 25/84* (2013.01); *G10L 25/90* (2013.01)

(58) Field of Classification Search
CPC ......... G10L 25/21; G10L 25/81; G10L 25/84; G10L 25/90
See application file for complete search history.

(56) References Cited

U.S. PATENT DOCUMENTS

| | | | | |
|---|---|---|---|---|
| 2003/0004720 | A1* | 1/2003 | Garudadri | G10L 15/30 704/E15.047 |
| 2004/0196913 | A1* | 10/2004 | Chakravarthy | G10L 19/025 704/E19.01 |
| 2010/0004926 | A1* | 1/2010 | Neoran | G10L 25/48 704/201 |
| 2011/0016077 | A1* | 1/2011 | Vasilache | G10L 25/78 706/54 |
| 2011/0202337 | A1* | 8/2011 | Fuchs | G10L 19/20 704/231 |
| 2013/0339035 | A1* | 12/2013 | Chordia | G10L 21/055 704/500 |
| 2014/0108020 | A1* | 4/2014 | Sharma | G10L 19/018 704/500 |
| 2014/0192987 | A1* | 7/2014 | Van Dongen | G10L 19/008 381/23 |
| 2015/0332667 | A1* | 11/2015 | Mason | G10L 15/02 704/249 |
| 2016/0155456 | A1* | 6/2016 | Wang | G10L 19/06 704/208 |
| 2016/0293175 | A1* | 10/2016 | Atti | G10L 19/22 |
| 2016/0379627 | A1* | 12/2016 | Yassa | G10L 25/78 704/255 |
| 2019/0392852 | A1* | 12/2019 | Hijazi | H04N 21/2335 |
| 2020/0075033 | A1* | 3/2020 | Hijazi | G06N 3/086 |

OTHER PUBLICATIONS

Bicego, Manuele, and Sisto Baldo. "Properties of the Box-Cox transformation for pattern classification." Neurocomputing 218 (2016): 390-400. (Year: 2016).*

3GPP TS 26.445 V12 "Universal Mobile Telecommunications System (UMTS); LTE;EVS Codec Detailed Algorithmic Description", v.12.0.0, Nov. 5, 2014, pp. 1-89.

I.T. Jolliffe "Principal Component Analysis, Second Edition", 2002, pp. 1-25.

3GPP SA4 contribution S4-170749 "New WID on EVS Codec Extension for Immersive Voice and Audio Services", SA4 meeting #94, Jun. 26-30, 2017, 4 sheets http://www.3gpp.org/ftp/tsg_sa/WG4_CODEC/TSGS4_94/Docs/S4-170749.zip.

Baumgarte et al., "Binaural cue coding—Part I: Psychoacoustic fundamentals and design principles," IEEE Trans. Speech Audio Processing, vol. 11, No. 6, Nov. 2003, pp. 509-519.

Box et al., "An analysis of transformations", Journal of the Royal Statistical Society, Series B, 26, 1964, pp. 211-252.

D'Agostino et al., "Tests for departure from normality", Biometrika, vol. 60, No. 3, 1973, pp. 613-622.

D'Agostino et al., "A suggestion for using powerful and informative tests of normality", The American Statistician, vol. 44, No. 4, Nov. 1990, pp. 316-321.

Malenovsky et al., "Two-stage speech/music classifier with decision smoothing and sharpening in the EVS codec," 2015 IEEE International Conference on Acoustics, Speech and Signal Processing (ICASSP), Brisbane, QLD, 2015, pp. 5718-5722.

Neuendorf et al., "The ISO/MPEG Unified Speech and Audio Coding Standard—Consistent High Quality for All Content Types and at All Bit Rates". J. Audio Eng. Soc., vol. 61, No. 12, Dec. 2013, pp. 956-977.

Rao et al., "Speech Processing in Mobile Environments, Appendix A: MFCC features", Springer International Publishing, 2014, pp. 103-121.

Dietz et al., "Overview of the EVS codec architecture", 2015 IEEE International Conference of Acoustics, Speech and Signal Processing (ICASSP), Apr. 19, 2015, pp. 5698-5702.

* cited by examiner

METHOD AND DEVICE FOR SPEECH/MUSIC CLASSIFICATION AND CORE ENCODER SELECTION IN A SOUND CODEC

TECHNICAL FIELD

The present disclosure relates to sound coding, more specifically to speech/music classification and core encoder selection in, in particular but not exclusively, a multi-channel sound codec capable of producing a good sound quality for example in a complex audio scene at low bit-rate and low delay.

In the present disclosure and the appended claims:

The term "sound" may be related to speech, audio and any other sound;

The term "stereo" is an abbreviation for "stereophonic"; and

The term "mono" is an abbreviation for "monophonic".

BACKGROUND

Historically, conversational telephony has been implemented with handsets having only one transducer to output sound only to one of the user's ears. In the last decade, users have started to use their portable handset in conjunction with a headphone to receive the sound over their two ears mainly to listen to music but also, sometimes, to listen to speech. Nevertheless, when a portable handset is used to transmit and receive conversational speech, the content is still mono but presented to the user's two ears when a headphone is used.

With the newest 3GPP speech coding standard, EVS (Enhanced Voice Services) as described in Reference [1] of which the full content is incorporated herein by reference, the quality of the coded sound, for example speech and/or audio, that is transmitted and received through a portable handset has been significantly improved. The next natural step is to transmit stereo information such that the receiver gets as close as possible to a real life audio scene that is captured at the other end of the communication link.

In audio codecs, for example as described in Reference [2] of which the full content is incorporated herein by reference, transmission of stereo information is normally used.

For conversational speech codecs, mono signal is the norm. When a stereo sound signal is transmitted, the bit-rate is often doubled since both the left and right channels of the stereo sound signal are coded using a mono codec. This works well in most scenarios, but presents the drawbacks of doubling the bit-rate and failing to exploit any potential redundancy between the two channels (left and right channels of the stereo sound signal). Furthermore, to keep the overall bit-rate at a reasonable level, a very low bit-rate for each of the left and right channels is used, thus affecting the overall sound quality. To reduce the bit-rate, efficient stereo coding techniques have been developed and used. As non-limitative examples, two stereo coding techniques that can be efficiently used at low bit-rates are discussed in the following paragraphs.

A first stereo coding technique is called parametric stereo. Parametric stereo encodes two inputs (left and right channels) as mono signals using a common mono codec plus a certain amount of stereo side information (corresponding to stereo parameters) which represents a stereo image. The two inputs are down-mixed into a mono signal and the stereo parameters are then computed. This is usually performed in frequency domain (FD), for example in the Discrete Fourier Transform (DFT) domain. The stereo parameters are related to so-called binaural or inter-channel cues. The binaural cues (see for example Reference [3], of which the full content is incorporated herein by reference) comprise Interaural Level Difference (ILD), Interaural Time Difference (ITD) and Interaural Correlation (IC). Depending on the sound signal characteristics, stereo scene configuration, etc., some or all binaural cues are coded and transmitted to the decoder. Information about what binaural cues are coded and transmitted is sent as signaling information, which is usually part of the stereo side information. Also, a given binaural cue can be quantized using different coding techniques which results in a variable number of bits being used. Then, in addition to the quantized binaural cues, the stereo side information may contain, usually at medium and higher bit-rates, a quantized residual signal that results from the down-mixing. The residual signal can be coded using an entropy coding technique, e.g. an arithmetic encoder.

Another stereo coding technique is a technique operating in time-domain. This stereo coding technique mixes the two inputs (left and right channels) into so-called primary and secondary channels. For example, following the method as described in Reference [4], of which the full content is incorporated herein by reference, time-domain mixing can be based on a mixing ratio, which determines respective contributions of the two inputs (left and right channels) upon production of the primary and secondary channels. The mixing ratio is derived from several metrics, for example normalized correlations of the two inputs (left and right channels) with respect to a mono signal or a long-term correlation difference between the two inputs (left and right channels). The primary channel can be coded by a common mono codec while the secondary channel can be coded by a lower bit-rate codec. Coding of the secondary channel may exploit coherence between the primary and secondary channels and might re-use some parameters from the primary channel.

Further, in last years, the generation, recording, representation, coding, transmission, and reproduction of audio is moving towards enhanced, interactive and immersive experience for the listener. The immersive experience can be described, for example, as a state of being deeply engaged or involved in a sound scene while sounds are coming from all directions. In immersive audio (also called 3D (Three-Dimensional) audio), the sound image is reproduced in all three dimensions around the listener, taking into consideration a wide range of sound characteristics like timbre, directivity, reverberation, transparency and accuracy of (auditory) spaciousness. Immersive audio is produced for a particular sound playback or reproduction system such as loudspeaker-based-system, integrated reproduction system (sound bar) or headphones. Then, interactivity of a sound reproduction system may include, for example, an ability to adjust sound levels, change positions of sounds, or select different languages for the reproduction.

There exist three fundamental approaches to achieve an immersive experience.

A first approach to achieve an immersive experience is a channel-based audio approach using multiple spaced microphones to capture sounds from different directions, wherein one microphone corresponds to one audio channel in a specific loudspeaker layout. Each recorded channel is then supplied to a loudspeaker in a given location. Examples of channel-based audio approaches are, for example, stereo, 5.1 surround, 5.1+4, etc.

A second approach to achieve an immersive experience is a scene-based audio approach which represents a desired sound field over a localized space as a function of time by a combination of dimensional components. The sound signals representing the scene-based audio are independent of the positions of the audio sources while the sound field is transformed to a chosen layout of loudspeakers at the renderer. An example of scene-based audio is ambisonics.

The third approach to achieve an immersive experience is an object-based audio approach which represents an auditory scene as a set of individual audio elements (for example singer, drums, guitar, etc.) accompanied by information such as their position, so they can be rendered by a sound reproduction system at their intended locations. This gives the object-based audio approach a great flexibility and interactivity because each object is kept discrete and can be individually manipulated.

Each of the above described audio approaches to achieve an immersive experience presents pros and cons. It is thus common that, instead of only one audio approach, several audio approaches are combined in a complex audio system to create an immersive auditory scene. An example can be an audio system that combines scene-based or channel-based audio with object-based audio, for example ambisonics with a few discrete audio objects.

SUMMARY

According to a first aspect, the present disclosure provides a two-stage speech/music classification device for classifying an input sound signal and for selecting a core encoder for encoding the sound signal, comprising: a first stage for classifying the input sound signal into one of a number of final classes; and a second stage for extracting high-level features of the input sound signal and for selecting the core encoder for encoding the input sound signal in response to the extracted high-level features and the final class selected in the first stage.

According to a second aspect, there is provided a two-stage speech/music classification method for classifying an input sound signal and for selecting a core encoder for encoding the sound signal, comprising: in a first stage, classifying the input sound signal into one of a number of final classes; and in a second stage, extracting high-level features of the input sound signal and selecting the core encoder for encoding the input sound signal in response to the extracted high-level features and the final class selected in the first stage.

The foregoing and other objects, advantages and features of a sound codec, including the two-stage speech/music classification device and method will become more apparent upon reading of the following non-restrictive description of illustrative embodiments thereof, given by way of example only with reference to the accompanying drawings.

DETAILED DESCRIPTION

In recent years, 3GPP ($3^{rd}$ Generation Partnership Project) started working on developing a 3D (Three-Dimensional) sound codec for immersive services called IVAS (Immersive Voice and Audio Services), based on the EVS codec (See Reference [5] of which the full content is incorporated herein by reference).

The present disclosure describes a speech/music classification technique and a core encoder selection technique in an IVAS coding framework. Both techniques are part of a two-stage speech/music classification method of which the result is core encoder selection.

Although the speech/music classification method and device are based on that in EVS (See Reference [6] and Reference [1], Section 5.1.13.6, of which the full content is incorporated herein by reference), several improvements and developments have been implemented. Also, the two-stage speech/music classification method and device are described in the present disclosure, by way of example only, with reference to an IVAS coding framework referred to throughout this disclosure as IVAS codec (or IVAS sound codec). However, it is within the scope of the present disclosure to incorporate such a two-stage speech/music classification method and device in any other sound codec.

Figure 1:
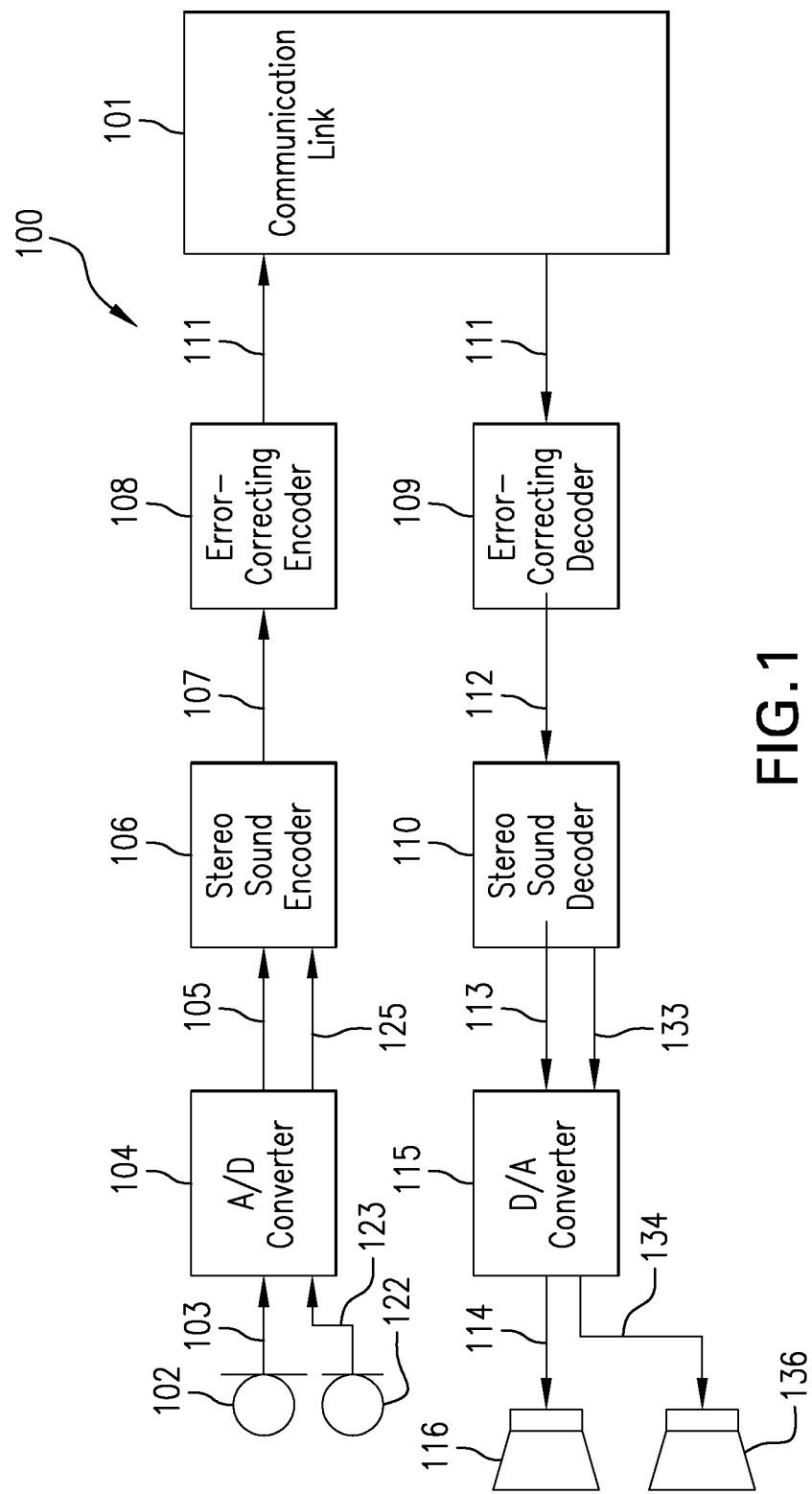
FIG. 1 is a schematic block diagram of a sound processing and communication system depicting a possible context of implementation of the sound codec, including the two-stage speech/music classification device and method.

FIG. 1 is a schematic block diagram of a stereo sound processing and communication system 100 depicting a possible context of implementation of the sound codec (IVAS codec), including the two-stage speech/music classification device and method.

The stereo sound processing and communication system 100 of FIG. 1 supports transmission of a stereo sound signal across a communication link 101. The communication link 101 may comprise, for example, a wire or an optical fiber link. Alternatively, the communication link 101 may comprise at least in part a radio frequency link. The radio frequency link often supports multiple, simultaneous communications requiring shared bandwidth resources such as may be found with cellular telephony. Although not shown, the communication link 101 may be replaced by a storage device in a single device implementation of the system 100 that records and stores the coded stereo sound signal for later playback.

Still referring to FIG. 1, for example a pair of microphones 102 and 122 produces left 103 and right 123 channels of an original analog stereo sound signal. As indicated in the foregoing description, the sound signal may comprise, in particular but not exclusively, speech and/or audio.

The left 103 and right 123 channels of the original analog stereo sound signal are supplied to an analog-to-digital (A/D) converter 104 for converting them into left 105 and right 125 channels of an original digital stereo sound signal. The left 105 and right 125 channels of the original digital stereo sound signal may also be recorded and supplied from a storage device (not shown).

A stereo sound encoder 106 codes the left 105 and right 125 channels of the original digital stereo sound signal thereby producing a set of coding parameters that are multiplexed under the form of a bit-stream 107 delivered to an optional error-correcting encoder 108. The optional error-correcting encoder 108, when present, adds redundancy to the binary representation of the coding parameters in the bit-stream 107 before transmitting the resulting bit-stream 111 over the communication link 101.

On the receiver side, an optional error-correcting decoder 109 utilizes the above mentioned redundant information in the received bit-stream 111 to detect and correct errors that may have occurred during transmission over the communication link 101, producing a bit-stream 112 with received coding parameters. A stereo sound decoder 110 converts the received coding parameters in the bit-stream 112 for creating synthesized left 113 and right 133 channels of the digital stereo sound signal. The left 113 and right 133 channels of the digital stereo sound signal reconstructed in the stereo sound decoder 110 are converted to synthesized left 114 and right 134 channels of the analog stereo sound signal in a digital-to-analog (D/A) converter 115.

The synthesized left 114 and right 134 channels of the analog stereo sound signal are respectively played back in a pair of loudspeaker units, or binaural headphones, 116 and 136. Alternatively, the left 113 and right 133 channels of the digital stereo sound signal from the stereo sound decoder 110 may also be supplied to and recorded in a storage device (not shown).

Figure 2:
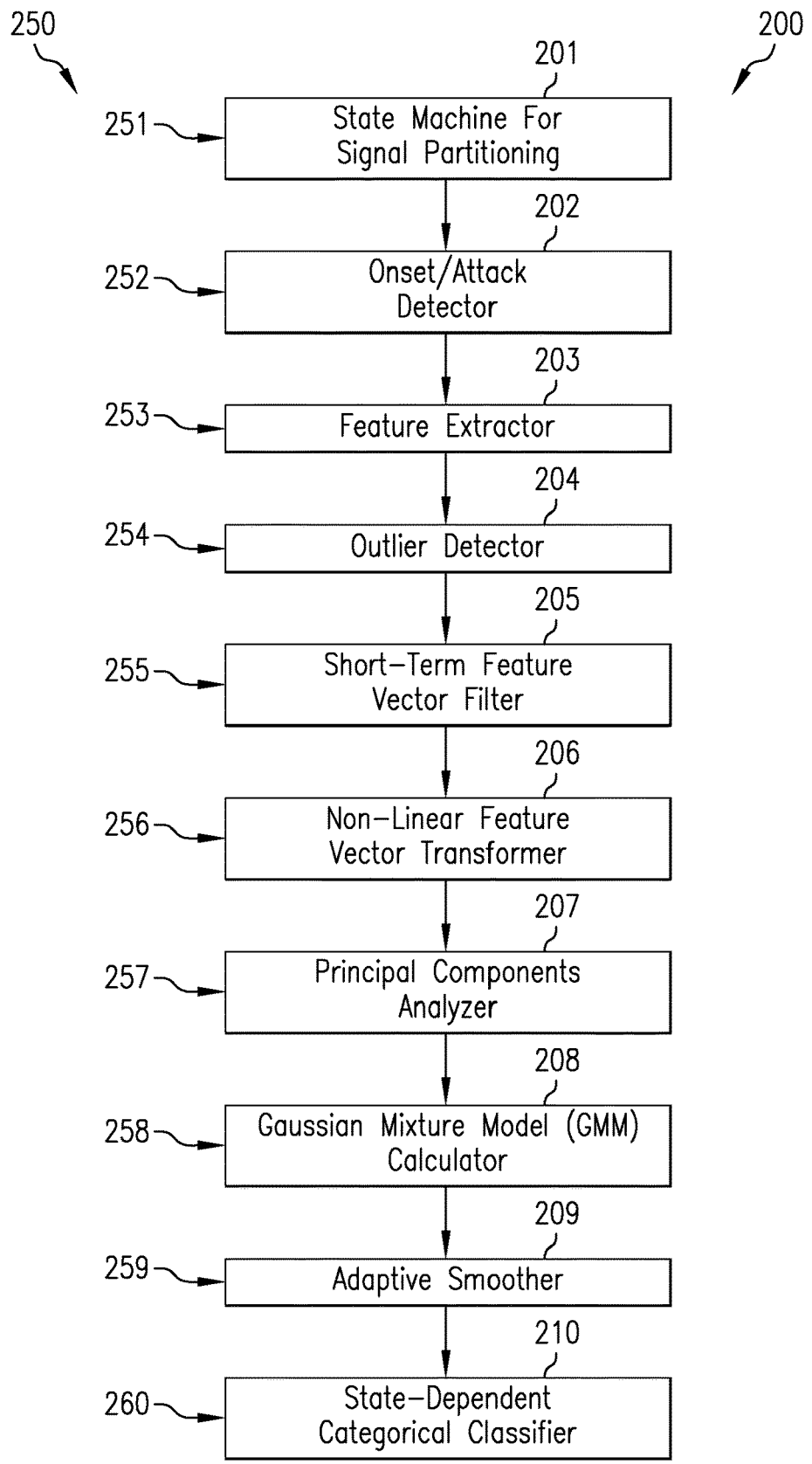
FIG. 2 is a schematic block diagram illustrating concurrently a first stage of the two-stage speech/music classification device and a first stage of the corresponding two-stage speech/music classification method.
Figure 3:
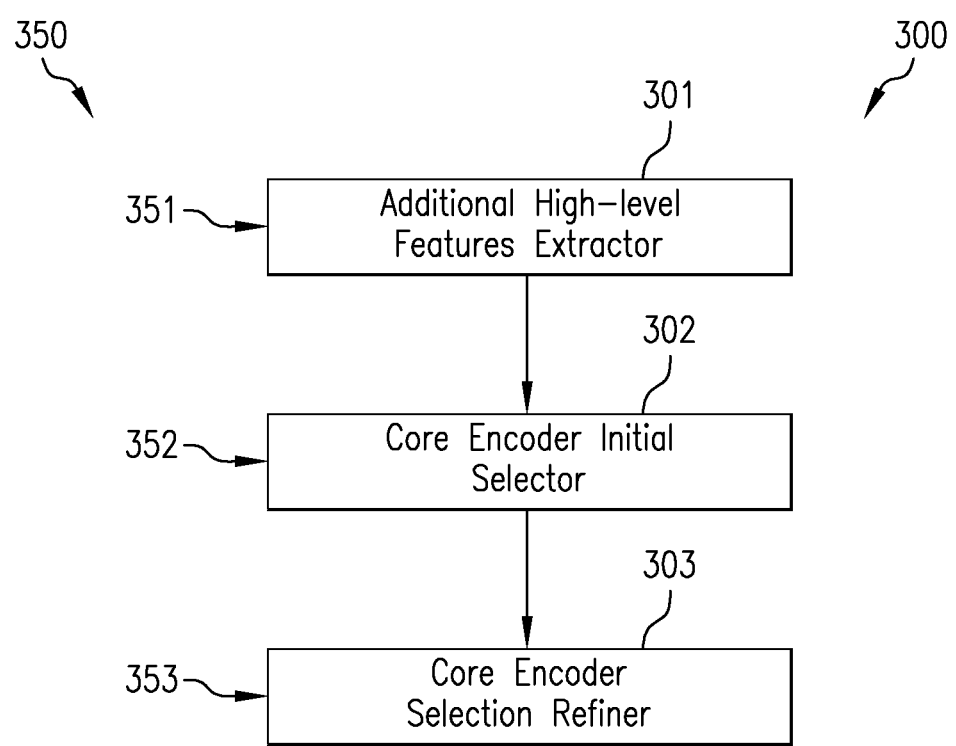
FIG. 3 is a schematic block diagram illustrating concurrently a second stage of the two-stage speech/music classification device and a second stage of the corresponding two-stage speech/music classification method.

For example, the stereo sound encoder 106 of FIG. 1 may be implemented by the encoder of the IVAS codec, including the two-stage speech/music classification device of FIGS. 2 and 3.

1. Two-Stage Speech/Music Classification

As indicated in the foregoing description, the present disclosure describes a speech/music classification technique and a core encoder selection technique in an IVAS coding framework. Both techniques are part of the two-stage speech/music classification method (and corresponding device) the result of which is the selection of a core encoder for coding a primary (dominant) channel (in case of Time Domain (TD) stereo coding) or a down-mixed mono channel (in case of Frequency Domain (FD) stereo coding). The basis for the development of the present technology is the speech/music classification in the EVS codec (Reference [1]). The present disclosure describes modifications and improvements that were implemented therein and that are part of a baseline IVAS codec framework.

The first stage of the speech/music classification method and device in the IVAS codec is based on a Gaussian Mixture Model (GMM). The initial model, taken from the EVS codec, has been extended, improved and optimized for the processing of stereo signals.

In summary:

- The GMM model takes feature vectors as input and provides probabilistic estimates for three classes including speech, music and background noise.
- The parameters of the GMM model are trained on a large collection of manually labelled vectors of features of the sound signal.
- The GMM model provides probabilistic estimates for each of the three classes in every frame, for example 20-ms frame. Sound signal processing frames, including sub-frames, are well known to those of ordinary skill in the art, but further information about such frames can be found, for example, in Reference [1].
- An outlier detection logic ensures proper processing of frames where one or more features of the sound signal do not fulfil the condition of normal distribution.
- Individual probabilities are turned into a single, unbound, score by means of logistic regression.
- The two-stage speech/music classification device has its own state machine which is used to partition the incoming signal into one of four states.
- Adaptive smoothing is applied on the output score depending on the current state of the two-stage speech/music classification method and device.
- Fast reaction of the two-stage speech/music classification method and device in rapidly varying content is achieved with an onset/attack detection logic based on relative frame energy.
- The smoothed score is used to perform a selection among the following three categories of signal type: pure speech, pure music, speech with music.

FIG. 2 is a schematic block diagram illustrating concurrently a first stage 200 of the two-stage speech/music classification device and a first stage 250 of the corresponding two-stage speech/music classification method.

Referring to FIG. 2, the first stage of the two-stage speech/music classification device comprises:

- A state machine 201 for signal partitioning;
- An onset/attack detector 202 based on relative frame energy;
- A feature extractor 203;
- An outlier detector 204 based on histograms;
- A short-term feature vector filter 205;
- A non-linear feature vector transformer 206 (Box-Cox);
- A Principal Component Analyzer (PCA) 207;
- A Gaussian Mixture Model (GMM) calculator 208;
- An adaptive smoother 209; and
- A state-dependent categorical classifier 210.

The core encoder selection technique (second stage of the two-stage speech/music classification device and method) in the IVAS codec is built on top of the first stage of the two-stage speech/music classification device and method and delivers a final output to perform selection of the core encoder from ACELP (Algebraic Code-Excited Linear Prediction), TCX (Transform-Coded eXcitation) and GSC (Generic audio Signal Coder) as described in Reference [7], of which the full content is incorporated herein by reference). Other suitable core encoders can also be implemented within the scope of the present disclosure.

In summary:
The selected core encoder is then applied to encode the primary (dominant) channel (in case of TD stereo coding) or the down-mixed mono channel (in case of FD stereo coding).

The core encoder selection uses additional high-level features calculated over a window which is generally longer than a window used in the first stage of the two-stage speech/music classification device method.

The core encoder selection uses its own attack/onset detection logic optimized for achieving seamless switching. The output of this attack/onset detector is different from the output of the attack/onset detector of the first stage.

The core encoder is initially selected based on the output of the state-dependent categorical classifier 210 of the first stage. Such selection is then refined by examining additional high-level features and the output of the onset/attack detector of this second stage.

FIG. 3 is a schematic block diagram illustrating concurrently a second stage 300 of the two-stage speech/music classification device and a second stage 350 of the corresponding two-stage speech/music classification method.

Referring to FIG. 3, the second stage of the two-stage speech/music classification device comprises:
An extractor 301 of additional high-level features;
An initial selector 302 of core encoder; and
A refiner 303 of the core encoder initial selection.

2. First Stage of the Two-Stage Speech/Music Classification Device and Method:

First, it should be mentioned that the GMM model is trained using an Expectation-Maximization (EM) algorithm on a large, manually labeled database of training samples. The database contains the mono items used in the EVS codec and some additional stereo items. The total size of the mono training database is approximately 650 MB. The original mono files are converted to corresponding dual mono variants before being used as inputs to the IVAS codec. The total size of the additional stereo training database is approximately 700 MB. The additional stereo database contains real recordings of speech signals from simulated conversations, samples of music downloaded from open sources on the internet and some artificially created items. The artificially created stereo items are obtained by convolving mono speech samples with pairs of real Binaural Room Impulse Responses (BRIRs). These impulse responses correspond to some typical room configurations, e.g. small office, seminar room, auditorium, etc. The labels for the training items are created semi-automatically using the Voice Activity Detection (VAD) information extracted from the IVAS codec; this is not optimal but frame-wise manual labeling is impossible given the size of the database.

2.1 State Machine for Signal Partitioning

Referring to FIG. 2, the first stage 250 of the two-stage speech/music classification method comprises an operation 251 of signal partitioning. To perform this operation, the first stage 200 of the two-stage speech/music classification device comprises a state machine 201.

The concept of state machine in the first stage is taken from the EVS codec. No major modifications have been made to the IVAS codec. The purpose of the state machine 201 is to partition the incoming sound signal into one of four states, INACTIVE, ENTRY, ACTIVE and UNSTABLE.

Figure 4:
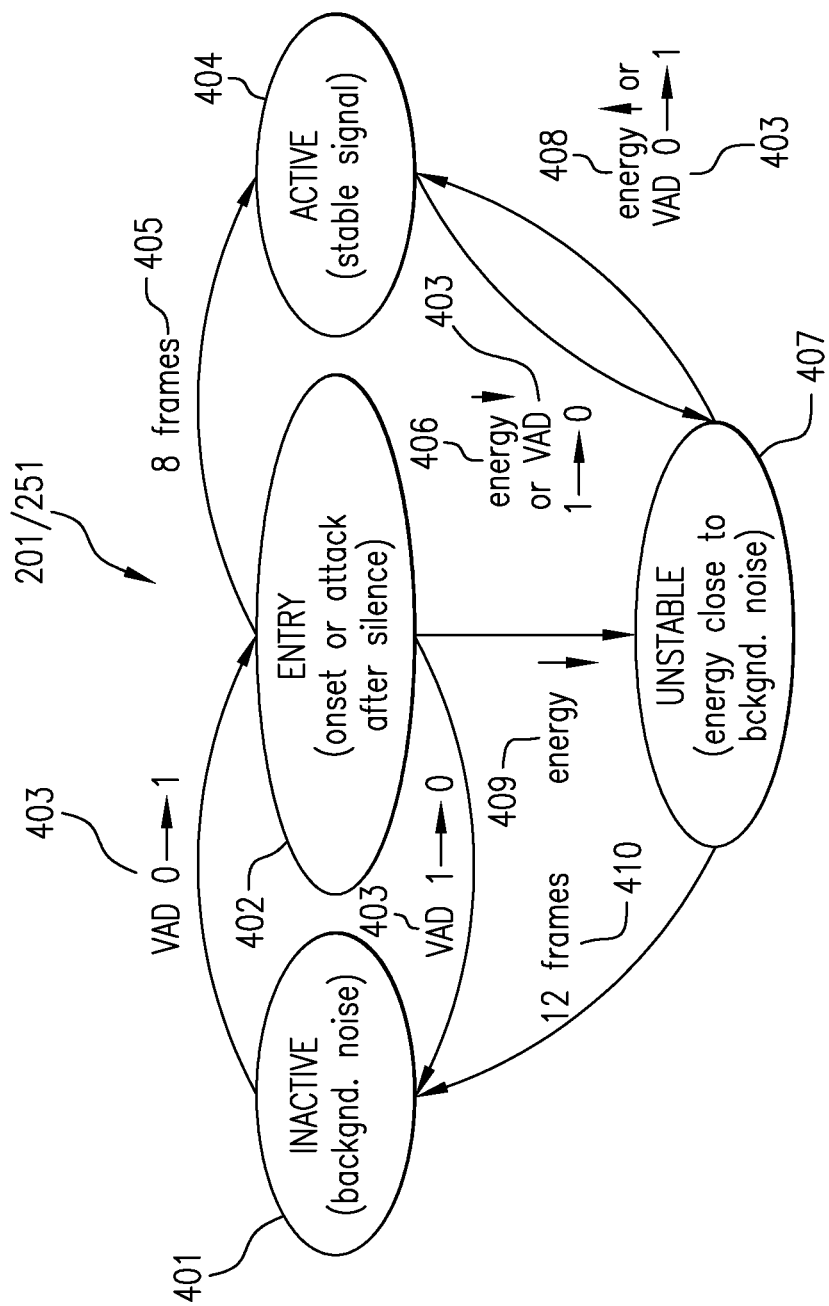
FIG. 4 is a schematic block diagram illustrating concurrently a state machine of the first stage of the two-stage speech/music classification device, and an operation of signal partitioning of the first stage of the two-stage speech/music classification method.

FIG. 4 is a schematic block diagram illustrating concurrently the state machine 201 of the first stage 200 of the two-stage speech/music classification device, and the operation 251 of signal partitioning of the first stage 250 of the two-stage speech/music classification method.

The schematic diagram of FIG. 4 also shows transition conditions used by the state machine 201 for transitioning the input sound signal from one of the states to the other, these transition conditions being related to characteristics of the input sound signal.

The INACTIVE state 401, indicative of background noise, is selected as the initial state.

The state machine 201 switches from the INACTIVE state 401 to the ENTRY state 402 when a VAD flag 403 (See Reference [1]) changes from "0" to "1". In order to produce the VAD flag used by the first stage of the two-stage speech/music classification method and device, any VAD detector or SAD (Sound Activity Detection) detector may be utilized. The ENTRY state 402 marks the first onset or attack in the input sound signal after a prolonged period of silence.

After, for example eight frames 405 in the ENTRY state 402, the state machine 201 enters the ACTIVE state 404 which marks the beginning of a stable sound signal with sufficient energy (a given level of energy). If the energy 409 of the signal suddenly decreases while the state machine 201 is in the ENTRY state 402, the state machine 201 changes from the ENTRY state to the UNSTABLE state 407, corresponding to an input sound signal with a level of energy close to background noise. Also, if the VAD flag 403 changes from "1" to "0" while the state machine 201 is in the ENTRY state 402, the state machine 201 returns to the INACTIVE state 401. This ensures continuity of classification during short pauses.

If the energy 406 of the stable signal (ACTIVE state 404) suddenly drops closer to the level of background noise or the VAD flag 403 changes from "1" to "0", the state machine 201 switches from the ACTIVE state 404 to the UNSTABLE state 407.

After a period of, for example, 12 frames 410 in the UNSTABLE state 407, the state machine 201 reverts to the INACTIVE state 401. If the energy 408 of the unstable signal suddenly increases or the VAD flag 403 changes from "0" to "1" while the state machine 201 is in the UNSTABLE state 407, the state machine 210 returns to the ACTIVE state 404. This ensures continuity of classification during short pauses.

In the following description, the current state of the state machine 201 is denoted $f_{SM}$. The constants assigned to the individual states may be defined as follows:

INACTIVE $f_{SM} = -8$

UNSTABLE $f_{SM} \in \langle -7, -1 \rangle$

ENTRY $f_{SM} \in \langle 0, 7 \rangle$

ACTIVE $f_{SM} = +8$

In the INACTIVE and ACTIVE states, $f_{SM}$ corresponds to a single constant whereas in the UNSTABLE and ENTRY states, $f_{SM}$ takes on multiple values depending on the progression of the state machine 201. Thus, in the UNSTABLE and ENTRY states, $f_{SM}$ may be used as a short-term counter.

2.2 Onset/Attack Detector

Referring to FIG. 2, the first stage 250 of the two-stage speech/music classification method comprises an operation 252 of onset/attack detection based on relative frame energy. To perform this operation, the first stage 200 of the two-stage speech/music classification device comprises an onset/attack detector 202.

The onset/attack detector 202 and the corresponding onset/attack detection operation 252 are adapted to the purposes and functions of the speech/music classification of the IVAS codec. The objective comprises, in particular but not exclusively, localization of both the beginnings of speech utterances (attacks) and the onsets of musical clips. These events are usually associated with abrupt changes in the characteristics of the input sound signal. Successful detection of signal onsets and attacks after a period of signal inactivity allows a reduction of the impact of past information in the process of score smoothing (described herein below). The onset/attack detection logic plays a similar role as the ENTRY state 402 of FIG. 4 in the state machine 201 (FIG. 2). The difference between these two concepts is related to their input parameter. The state machine 201 uses mainly the VAD flag 403 (FIG. 4) from the HE-SAD (High-Efficiency Sound Activity Detection) technology (See Reference [1]), whereas the onset/attack detector 252 uses differences in relative frame energy.

The relative frame energy $E_r$ may be computed as the difference between the frame energy in dB and the long-term average energy. The frame energy in dB may be computed using the following relation:

$$E_t = 10\log\left(\sum_{i=0}^{19} E_{CB}(i)\right)$$

where $E_{CB}(i)$ are the average energies per critical band (See Reference [1]). The long-term average frame energy may be computed using the following relation:

$$\overline{E}_f = 0.99\overline{E}_f + 0.01 E_t$$

with initial value $\overline{E}_f$=45 dB. The relative frame energy may be calculated as $$E_r = E_t - \overline{E}_f$$

The parameter used by the onset/attack detector 252 is a cumulative sum of differences between the relative energy of the input sound signal in a current frame and the relative energy of the input sound signal in a previous frame updated in every frame. This parameter is initialized to 0 and updated only when the relative energy in the current frame, $E_r(n)$, is greater than the relative energy in the previous frame, $E_r(n-1)$. The onset/attack detector 252 updates the cumulative sum $v_{run}(n)$ using, for example, the following relation:

$$v_{run}(n) = v_{run}((n-1) + (E_r(n) - E_r(n-1)))$$

where n is the index of the current frame. The onset/attack detector 252 uses the cumulative sum $v_{run}(n)$ to update a counter of onset/attack frames, $v_{cnt}$. The counter of the onset/attack detector 252 is initialized to 0 and incremented by 1 in every frame in the ENTRY state 402 where $v_{run}$>5. Otherwise, it is reset to 0.

The output of the attack/onset detector 202 is a binary flag, $f_{att}$, which is set to 1 for example when $0 < v_{run} < 3$ to indicate detection of an onset/attack. Otherwise, this binary flag is set to 0 to indicate no detection of onset/attack. This can be expressed as follows:

$$f_{att} = \begin{cases} 1 & 0 < v_{run} < 3 \\ 0 & \text{otherwise} \end{cases}$$

Figure 5:
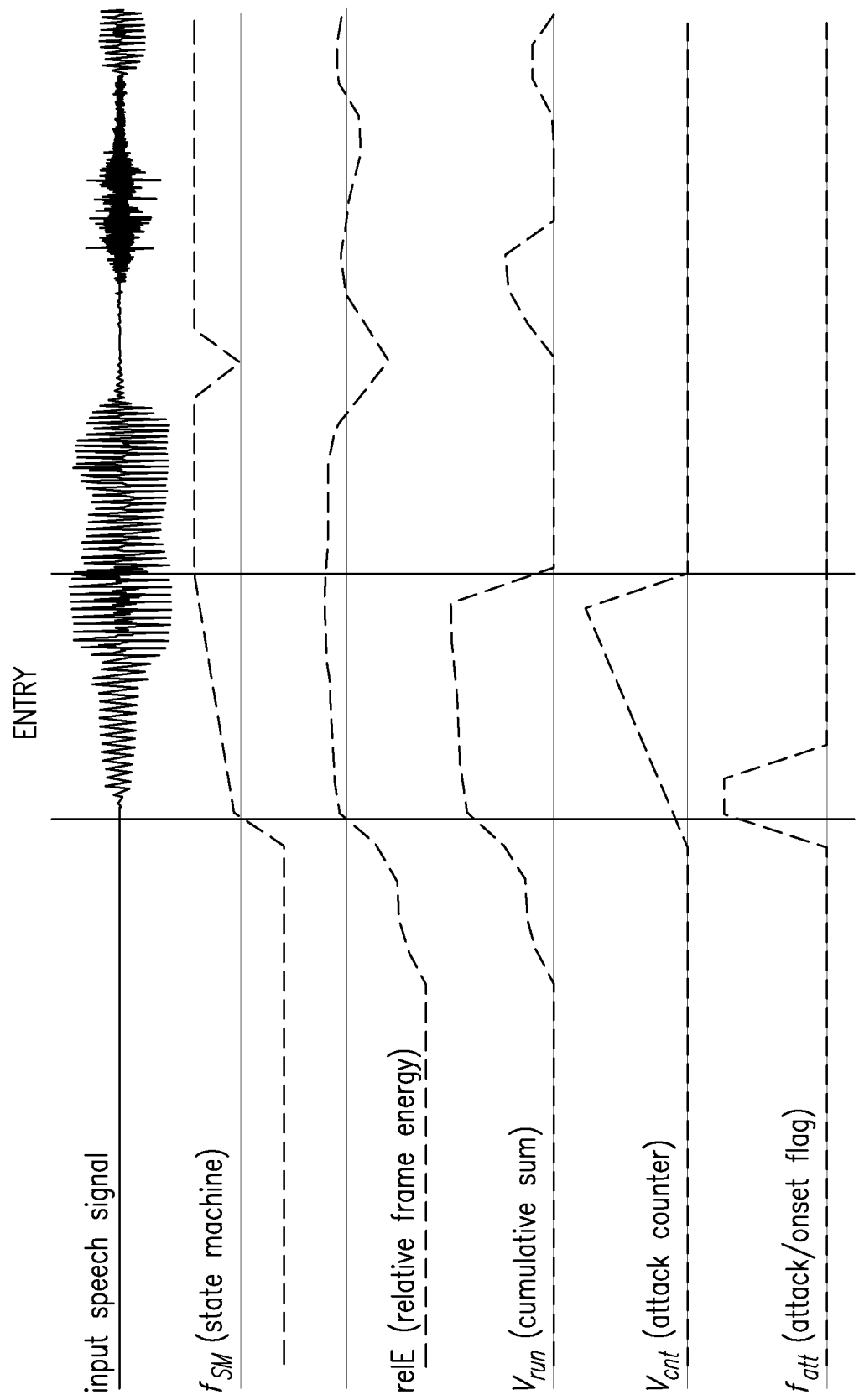
FIG. 5 is a graph showing a non-limitative example of onset/attack detection based on relative frame energy.

The operation of the onset/attack detector 202 is demonstrated, as a non-limitative example, by the graph of FIG. 5.

2.3 Feature Extractor

Referring to FIG. 2, the first stage 250 of the two-stage speech/music classification method comprises an operation 253 of extraction of features of the input sound signal. To perform this operation, the first stage 200 of the two-stage speech/music classification device comprises a feature extractor 203.

In the training stage of the GMM model, the training samples are resampled to 16 kHz, normalized to −26 dBov (dBov is a dB level relative to the overload point of the system) and concatenated. Then, the resampled and concatenated training samples are fed to the encoder of the IVAS codec to collect features using the feature extractor 203. For the purpose of feature extraction, the IVAS codec may be run in a FD stereo coding mode, TD stereo coding mode or any other stereo coding mode and at any bit-rate. As a non-limitative example, the feature extractor 203 is run in a TD stereo coding mode at 16.4 kbps. The feature extractor 203 extracts the following features used in the GMM model for speech/music/noise classification:

TABLE 1

Features used in the GMM model

| symbol | window length | description |
| --- | --- | --- |
| $T_{OL}$ | 30 ms | open-loop pitch |
| $\overline{R}_{xy3}$ | 30 ms | voicing measure |
| LSF | 25 ms | line spectral frequencies from the LP analysis |
| $\epsilon_p$ | 25 ms | residual energy from the LP analysis (Levinson-Durbin) |
| $C_{map}$ | 20 ms | short-term correlation map |
| $n_{sta}$ | 20 ms | non-stationarity |
| MFCC | 20 ms | mel-frequency cepstral coefficients |
| $P_{diff}$ | 20 ms | power spectrum difference |
| $P_{sta}$ | 20 ms | spectral stationarity |

With the exception of the MFCC feature, all of the above features are already present in the EVS codec (See Reference [1]).

The feature extractor 203 uses the open-loop pitch $T_{OL}$ and the voicing measure $\overline{R}_{xy3}$ for further analysis. Both these measures are calculated as averages over three adjacent signal segments of the input sound signal. The length of each segment is 10 ms. The LSF (Line Spectral Frequencies) feature is a vector of M values where M is the order of the LP (Linear Prediction) analysis. The residual energy $\epsilon_p$ from the LP analysis is a vector of M+1 values calculated as part of the Levinson-Durbin algorithm. The short-term correlation map $C_{map}$ is a single parameter feature calculated as a by-product of the harmonic spectral analysis; it reflects both the harmonicity and spectral stability of the input sound signal. The non-stationarity feature $n_{sta}$ reflects the dynamics of spectral energy evolution. The dynamics are generally higher in speech signals than in music signals.

The MFCC feature is a vector of $N_{mel}$ values corresponding to mel-frequency cepstral coefficients, which are the results of a cosine transform of the real logarithm of the short-term energy spectrum expressed on a mel-frequency scale (See Reference [8], of which the full content is incorporated herein by reference).

The calculation of the last two features $P_{diff}$ and $P_{sta}$ uses, for example, the normalized per-bin power spectrum, $\tilde{P}_k$ defined as $$\tilde{P}_k = \frac{P_k}{\sum_{k=k_{low}}^{k_{high}} P_k}, k = k_{low}, \ldots, k_{high}$$

where $P_k$ is the per-bin power spectrum in the current frame calculated in the IVAS spectral analysis routine (See Reference [1]). The normalization is performed in the range $\langle k_{low}, k_{high}\rangle = \langle 3, 70\rangle$) corresponding to the frequency range of 150-3500 Hz.

The power spectrum difference, $P_{diff}$, may be defined as $$P_{diff} = \sum_{k=k_{low}}^{k_{high}} |P_k(n) - P_k(n-1)|$$

where the index (n) has been added to denote the frame index explicitly.

The spectral stationarity feature, $P_{sta}$, may be calculated from the sum of ratios of the normalized per-bin power spectrum and the power differential spectrum, using the following relation:

$$P_{sta} = \log\left(\sum_{k=k_{low}}^{k_{high}} \frac{\tilde{P}_k(n)}{|\tilde{P}_k(n) - \tilde{P}_k(n-1)|}\right)$$

The spectral stationarity is generally higher in frames containing frequency bins with higher amplitude and smaller spectrum difference at the same time.

2.4 Outlier Detector Based on Individual Feature Histograms

Referring to FIG. 2, the first stage 250 of the two-stage speech/music classification method comprises an operation 254 of detecting outlier features based on individual feature histograms. To perform operation 254, the first stage 200 of the two-stage speech/music classification device comprises an outlier detector 204.

Figure 6:
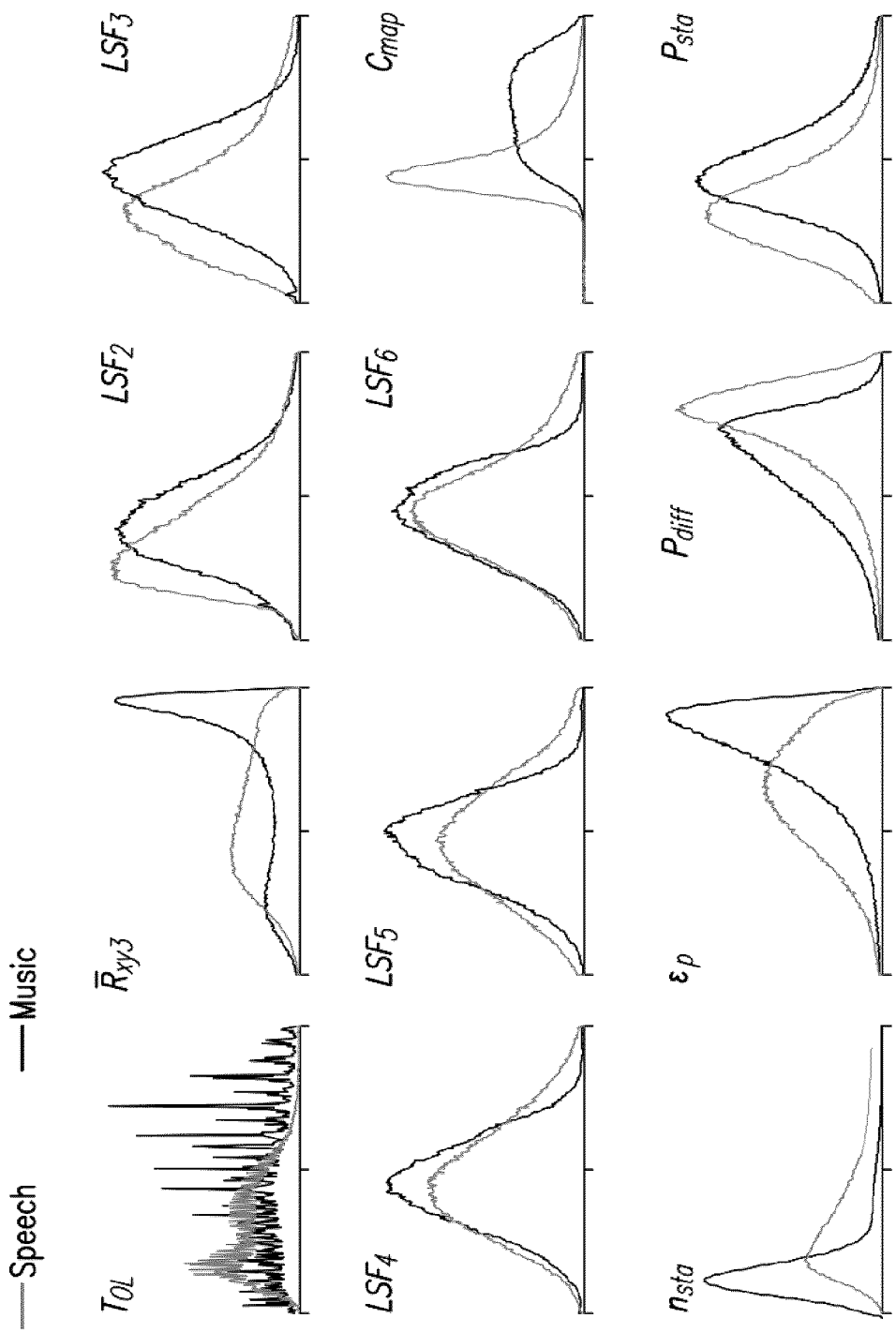
FIG. 6 represents histograms of selected features in a training database.

The GMM model is trained on vectors of the features collected from the IVAS codec on the large training database. The accuracy of the GMM model is affected to a large extent by the statistical distribution of the individual features. Best results are achieved when features are distributed normally, for example when $X \sim N(\mu, \sigma)$ where N represents a statistical distribution having a mean y and a variance u FIG. 6 shows histograms of some selected features on the large training database. As can be seen, the histograms of some features in FIG. 6 do not show that they were drawn from normal distribution.

The GMM model can represent to some extent features with non-normal distribution. If the value of one or more features is significantly different from its mean value, the vector of features is determined as an outlier. Outliers usually lead to incorrect probability estimates. Instead of discarding the vector of features, it is possible to replace the outlier features, for example with feature values from the previous frame, an average feature value across a number of previous frames, or by a global mean value over a significant number of previous frames.

Figure 7:
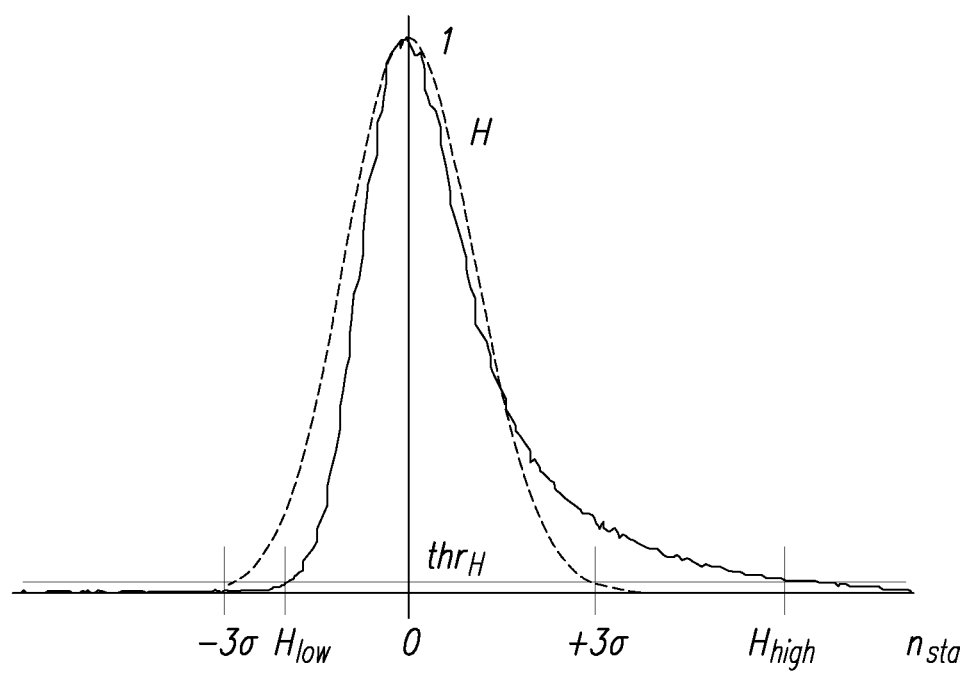
FIG. 7 shows a graph illustrating detection of outlier features based on histogram values.

The detector 204 detects outliers in the first stage 200 of the two-stage speech/music classification device on the basis of the analysis of individual feature histograms (See for example FIG. 6 showing feature histograms and FIG. 7 showing a graph illustrating detection of outliers based on histogram values) calculated on the training database. For each feature, a lower bound $H_{low}$ and an upper bound $H_{high}$ for outlier detection are calculated using, for example, the following relations:

$$H_{low} = \min_i(|H(i) - thr_H|) \text{ for } i = 0, \ldots, i_{max}$$

$$H_{high} = \min_i(|H(i) - thr_H|) \text{ for } i = i_{max}, \ldots, I$$

where H(i) is the feature histogram normalized such that max(H(i))=1, i is a frequency bin index ranging from 0 to I=500 bins, and $i_{max}$ is the bin containing a maximum value of the histogram for this feature. The threshold $thr_H$ is set to $1e^{-4}$. This specific value for the threshold $thr_H$ has the following explanation. If the true statistical distribution of the feature was normal with zero mean μ and variance σ, it could be re-scaled such that its maximum value was equal to 1. In that case the probability density function (PDF) could be expressed as $$f_{xs}(x \mid 0, \sigma^2) = e^{-\frac{x^2}{2\sigma^2}}$$

By substituting $f_x(xo, a^2)$ with the threshold $thr_H$ and rearranging the variables the following relation is obtained:

$x = \sigma\sqrt{-2\log(thr_H)}$

For $thr_H = 1e^{-4}$ the following is obtained:

$x \cong 2.83\sigma$

Thus, applying the threshold of $1e^{-4}$ leads to trimming the probability density function to the range of $+2.83\sigma$ around the mean value provided that the distribution was normal and scaled such that the density probability function $f_{xs}(0|0, \sigma^2) = 1$. The probability that a feature value lies outside the trimmed range is given by, for example, the following relation:

$$p_{out} = 1 - \text{erf}\left(\frac{2.83\sigma}{\sqrt{2}}\right)$$

where erf(.) is the Gauss error function known from the theory of statistics.

If the variance of the feature values was σ=1, then the percentage of the detected outliers would be approximately 0.47%. The above calculations are only approximate since the true distribution of feature values is not normal. This is illustrated by the histogram of the non-stationarity feature $n_{sta}$ in FIG. 6 where the tail on the right side of its mean value is "heavier" than the tail on the left side of its mean value. If sample variance σ was used as a basis for outlier detection and the interval was set to, for example, ±3σ many "good" values on the right side of the mean value would be classified as outliers.

The lower $H_{low}$ and the upper $H_{high}$ bounds are calculated for each feature used by the first stage 250/200 of the two-stage speech/music classification method and device and stored in the memory of the IVAS codec. When running the encoder of the IVAS codec, the outlier detector 204 compares the value $X_1(n)$ of each feature j in the current frame n against the bounds $H_{low}$ and $H_{high}$ of that feature, and marks the features j having a value lying outside of the corresponding ranges defined between the lower and upper bounds as an outlier feature. This can be expressed as $$f_{odv}(j) = \begin{cases} 0 & \text{if } H_{low} \leq X_j(n) \leq H_{high} \\ 1 & \text{otherwise} \end{cases} \text{ for } j=1, \ldots, F$$

where F is the number of features. The outlier detector 204 comprises a counter (not shown) of outlier features, $c_{odv}$, representing the number of detected outliers, using, for example, the following relation:

$$c_{odv} = \sum_{j=1}^{F} f_{odv}(j)$$

If the number of outlier features is equal to or higher than, for example 2, then the outlier detector 204 set a binary flag, $f_{out}$, to 1. This can be expressed as follows:

$$f_{out} = \begin{cases} 1 & \text{if } c_{odv} \geq 2 \\ 0 & \text{otherwise} \end{cases}$$

The flag $f_{out}$ is used for signaling that the vector of the features is an outlier. If the flag $f_{out}$ is equal to one, then the outlier features $X_j(n)$ are replaced, for example, with the values from the previous frame, as follows:

$$X_j(n)=X_j(n-1) \text{ for } j=1, \ldots, F \text{ if } f_{odv}(j)=1$$

2.5 Short-Term Feature Vector Filter

Referring to FIG. 2, the first stage 250 of the two-stage speech/music classification method comprises an operation 255 of filtering a short-term feature vector. To perform operation 255, the first stage 200 of the two-stage speech/music classification device comprises a short-term feature vector filter 205 for smoothing a short-term vector of the extracted features.

The speech/music classification accuracy is improved with feature vector smoothing. This can be performed by applying the following short-term Infinite Impulse Response (IIR) filter used as the short-term feature vector filter 205:

$$\tilde{X}_j(n)=\alpha_m \tilde{X}_j(n-1)+(1-\alpha_m)X_j(n)) \text{ for } j=1, \ldots, F$$

where $\tilde{X}_j(n)$ represents the short-term filtered features in frame n and $\alpha_m=_00.5$ is a so-called forgetting factor.

Feature vector smoothing (operation 255 of filtering a short-term feature vector) is not performed in frames in the ENTRY state 402 of FIG. 4 where $f_{att}=1$ or $f_{out}=1$, to avoid the smearing effect on strong attacks or outliers at the beginning of ACTIVE signal segments where the informative potential of the feature vector in the previous frame is limited. Smoothing is also not performed in the ACTIVE state 404 (stable signal) of FIG. 4 in frames classified as onset/transient by the IVAS transient classification algorithm (See Reference [1]). When short-term feature vector filtering operation 255 is not performed, the values $X_j(n)$ of the features of the non-filtered vector are simply copied over and used. This can be expressed by the following relation:

$$\tilde{X}_j(n)=X_j(n) \text{ for } j=1, \ldots, F$$

In the following description, the original symbol for feature values $X_j(n)$ is used instead of $\tilde{X}_j(n)$, i.e. it is assumed that $$\tilde{X}_j(n)=X_j(n) \text{ for } j=1, \ldots, F$$

2.6 Non-Linear Feature Vector Transformation (Box-Cox)

Referring to FIG. 2, the first stage 250 of the two-stage speech/music classification method comprises an operation 256 of non-linear feature vector transformation. To perform operation 256, the first stage 200 of the two-stage speech/music classification device comprises a non-linear feature vector transformer 206.

Figure 8:
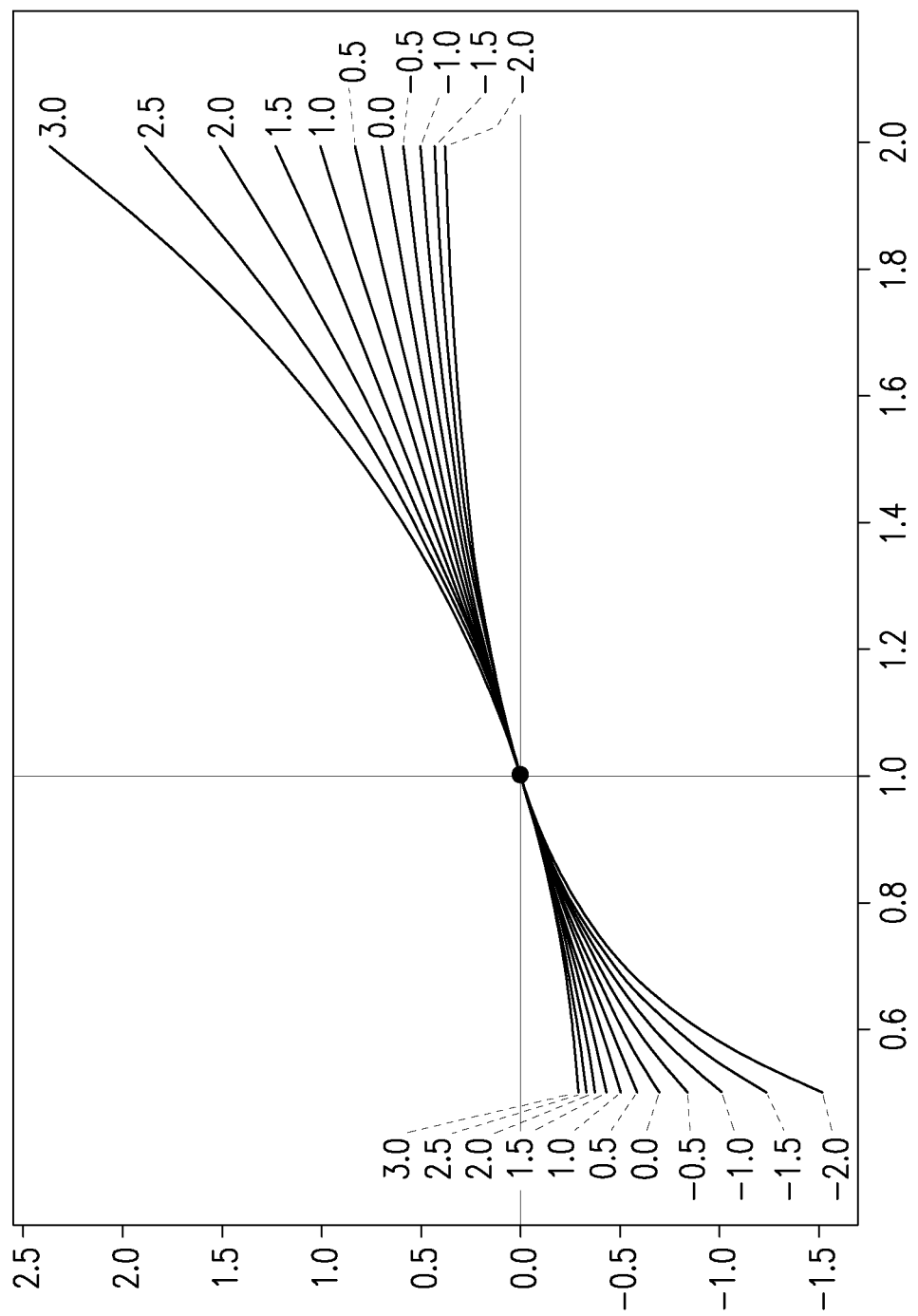
FIG. 8 is a graph showing Box-Cox transformation curves for different values of a power transform exponent 2.

As shown by the histograms of FIG. 6, multiple features used in the speech/music classification are not normally distributed so that best accuracy of the GMM cannot be achieved. As a non-limitative example, the non-linear feature vector transformer 206 can use Box-Cox transformation as described in Reference [9], of which the full content is incorporated herein by reference, to transform non-normal features into features having a normal shape. The Box-Cox transformation $X_{box}$ of feature X is a parametric non-linear power transformation defined as follows:

$$X_{box} = \begin{cases} \dfrac{(X+\Delta)^\lambda - 1}{\lambda} & \text{if } \lambda \neq 0 \\ \log(X+\Delta_j) & \text{if } \lambda = 0 \end{cases}$$

where $\lambda$ is the exponent of the power transform which varies from $-5$ to $+5$ (See FIG. 8 for examples; FIG. 8 is a graph showing Box-Cox transformation curves for different values of the power transform exponent $\lambda$). The Box-Cox transformation is defined only for positive inputs. Therefore, some bias $\Delta$ is added to ensure all input values of the features are positive. This bias corresponds to a minimal feature value across the entire training database. That is $$\Delta = \min_n(X(n)) \text{ for } n=0, \ldots, N$$

where N is the number of samples of the feature in the training database.

During the training process, the non-linear feature vector transformer 206 considers and tests all values of the exponent) to select an optimal value of exponent $\lambda$ based on a normality test. The normality test is based on the D'Agostino and Pearson's method as described in Reference [10], of which the full content is incorporated herein by reference, combining skew and kurtosis of the probability distribution function. The normality test produces the following skew and kurtosis measure $r_{sk}$ (S-K measure):

$$r_{sk}=s^2+k^2$$

where s is the z-score returned by the skew test and k is the z-score returned by the kurtosis test. See Reference [11], of which the full content is incorporated herein by reference, for details about the skew test and the kurtosis test.

The normality test also returns a two-sided chi-squared probability for null hypothesis, i.e. that the feature values were drawn from a normal distribution. The optimal value of the exponent $\lambda$ minimizes the S-K measure. This can be expressed by the following relation:

$$\lambda_j = \min_\lambda(r_{sk}(\lambda)) \text{ for } \lambda=-2, \ldots, 3$$

where the subscript j means that the above minimization process is done for each individual feature j=1, ..., F.

In the encoder, the non-linear feature vector transformer 206 applies the Box-Cox transformation only to selected features satisfying the following condition related to the S-K measure:

$$\frac{r'_{sk}(j)}{r_{sk}(j)} < 0.1 \text{ for } j = 1, \ldots, F$$

where $r_{sk}(j)$ is the S-K measure calculated on the jth feature before the Box-Cox transformation and $r_{sk}'(j)$ is the S-K measure after Box-Cox transformation with optimal value of exponent $\lambda_j$. The optimal exponent values, $\lambda_j$, and the associated biases, $\Delta_j$, of the selected features are stored in the memory of the VAS codec.

In the following description, the original symbol for feature values $X_j(n)$ will be used instead of $X_{box,j}(n)$, i.e. it is assumed that $X_j(n) \leftarrow X_{box,j}(n)$ for the selected features

2.7 Principal Component Analyzer

Referring to FIG. 2, the first stage 250 of the two-stage speech/music classification method comprises an operation 257 of Principal Component Analysis (PCA) to reduce sound signal feature dimensionality and increase sound signal class discriminability. To perform operation 257, the first stage 200 of the two-stage speech/music classification device comprises a principal component analyzer 207 of principal components.

After the operation 255 of short-term feature vector filtering and the operation 256 of non-linear feature vector transformation, the principal component analyzer 207 standardizes the feature vector by removing a mean of the features and scaling them to unit variance. For that purpose, the following relation can be used:

$$\acute{X}_j(n) = \frac{X_j(n-1) - \mu_j}{s_j} \text{ for } j = 1, \ldots, F$$

where $\acute{X}_j(n)$ represents the standardized feature, $\mu_j$ is the mean and $s_j$ the standard deviation of feature $X_j$ across the training database and, as mentioned above, n represents the current frame.

The mean and the deviation $\mu_j$ of feature $X_j$ may be calculated as follows:

$$\mu_j = \frac{1}{N}\sum_{n=1}^{N} X_j(n)$$

$$s_j = \sqrt{\frac{1}{N}\sum_{n=1}^{N}(X_j(n) - \mu_j)^2}$$

with N representing the total number of frames in the training database.

In the following description, the original symbol for feature values $X_j(n)$ will be used instead of $\acute{X}_j(n)$, i.e. it is assumed that:

$X_j(n) \leftarrow \acute{X}_j(n)$ for $n=1, \ldots, N$

The principal component analyzer 207 then processes the feature vector using PCA where the dimensionality is reduced, for example, from F=15 to $F_{PCA}=12$. PCA is an orthogonal transformation to convert a set of possibly correlated features into a set of linearly uncorrelated variables called principal components (See Reference [12], of which the full content is incorporated herein by reference). In the speech/music classification method, the analyzer 207 transforms the feature vectors using, for example, the following relation:

$Y(n) = W^T X(n)$ where $X(n)$ is a F-dimensional column feature vector and W is a $F \times F_{PCA}$ matrix of PCA loadings whose columns are the eigenvectors of $X^T(n)X(n)$, where the superscript T indicates vector transpose. The loadings are found by means of Singular Value Decomposition (SVD) of the feature samples in the training database. The loadings are calculated in the training phase only for active frames, for example in frames where the VAD flag is 1. The calculated loadings are stored in the memory of the IVAS codec.

In the following description, the original symbol for the vector of features $X(n)$ will be used instead of $Y(n)$, i.e. it is assumed that:

$X(n) \leftarrow Y(n)$

2.8 Gaussian Mixture Model (GMM)

Referring to FIG. 2, the first stage 250 of the two-stage speech/music classification method comprises an operation 258 of Gaussian Mixture Model (GMM) calculation. To perform operation 258, the first stage 200 of the two-stage speech/music classification device comprises a GMM calculator 208. As will be seen, the GMM calculator 208 estimates a decision bias parameter by maximizing a harmonic balanced accuracy on the training database. The decision bias is a parameter that has been added to the GMM to improve the accuracy of determination of the "MUSIC" class because of insufficient training data A multivariate GMM is parameterized by a mixture of component weights, component means and covariance matrices. The speech/music classification method uses three GMMs, each trained on its own training database, i.e. a "speech" GMM, a "music" GMM and a "noise" GMM. In a GMM with K components, each component has its own mean, $p_k$ and its covariance matrix, $\Sigma_k$. In the speech/music classification method the three (3) GMMs are fixed with K=6 components. The component weights are denoted $\phi_k$, with the constraint that $\Sigma_{k=1}^{K}\phi_k=1$ so that the probability distribution is normalized. The probability p(X) that a given feature vector X is generated by the GMM may be calculated using the following relation:

$$p(X) = \sum_{k=1}^{K} \phi_k \frac{1}{\sqrt{(2\pi)^K |\Sigma_k|}} \exp\left(-\frac{1}{2}(X-\mu_k)^T \Sigma_k^{-1}(X-\mu_k)\right)$$

In the above relation, calculation of the exponential function exp( . . . ) is a complex operation. The parameters of the GMMs are calculated using an Expectation-Maximization (EM) algorithm. It is well known that an Expectation-Maximization algorithm can be used for latent variables (variables that are not directly observable and are actually inferred from the values of the other observed variables) in order to predict their values with the condition that the general form of probability distribution governing those latent variables is known.

To reduce the complexity of probability calculations, the above relation may be simplified by taking the logarithm of the inner term inside the summation term Σ, as follows:

$$\text{score}(X) = \sum_{k=1}^{K} \log(\phi_k) - \frac{1}{2}\log\left((2\pi)^K |\Sigma_k|\right) - \frac{1}{2}(X - \mu_k)^T \Sigma_k^{-1}(X - \mu_k)$$

The output of the above, simplified formula is called the "score". The score is an unbounded variable proportional to the log-likelihood. The higher the score, the higher the probability that a given feature vector was generated by the GMM. The score is calculated by the GMM calculator 208 for each of the three GMMs. The score $\text{score}_s(X)$ on the "speech" GMM and the score $\text{score}_M(X)$ on the "music" GMM are combined into a single value $\Delta_s(X)$ by calculating their difference to obtain a differential score $\Delta_s(X)$, using, for example, the following relation:

$$\Delta_s(X) = \text{score}_M(X) - \text{score}_s(X)$$

Negative values of the differential score are indicative that the input sound signal is a speech signal whereas positive values are indicative that the input sound signal is a music signal. It is possible to introduce a decision bias $b_s$ in the calculation of the differential score $\text{dlp}(X, b_s)$ by adding a non-negative value to the differential score, using the following relation:

$$\text{dlp}(X, b_s) = \text{score}_M(X) - \text{score}_s(X) + b_s$$

The value of the decision bias, $b_s$, is found based on the ensemble of differential score$_s$ calculated on the training database. The process of finding the value of the decision bias $b_s$ can be described as follows.

Let $X_t$ represent a matrix of the feature vectors from the training database. Let $y_t$ be a corresponding label vector. Let the values of ground-truth SPEECH frames in this vector be denoted as +1.0 and the values in the other frames as 0. The total number of ACTIVE frames in the training database is denoted as $N_{act}$.

The differential score$_s$ $\text{dlp}(X, b_s)$ may be calculated in the active frames in the training database after EM training, i.e. when the parameters of the GMM are known. It is then possible to predict labels $Y_{pred}(n)$ in the active frames of the training database using, for example, the following relation:

$$y_{pred}(n) = 0.5 \ast [\text{sign}[-1.0\ \text{dlp}(X(n), b_s=0)] + 1.0]$$

where sign[.] is a signum function and $\text{dlp}(X(n), b_s=0)$ represents the differential score$_s$ calculated under the assumption of $b_s=0$. The resulting values of the labels $Y_{pred}(n)$ are either equal to +1.0 indicating SPEECH or 0 indicating MUSIC or NOISE.

The accuracy of this binary predictor can be summarized with the following four statistical measures:

$$c_{tp} = \frac{1}{\sum_{n=1}^{N} E_r(n)} \sum_{n=1}^{N} E_r(n) y_{pred}(n) y_t(n)$$

$$c_{fp} = \frac{1}{\sum_{n=1}^{N} E_r(n)} \sum_{n=1}^{N} E_r(n) y_{pred}(n) |y_t(n) - 1|$$

$$c_{tn} = \frac{1}{\sum_{n=1}^{N} E_r(n)} \sum_{n=1}^{N} E_r(n) |y_{pred}(n) - 1| |y_t(n) - 1|$$

$$c_{fn} = \frac{1}{\sum_{n=1}^{N} E_r(n)} \sum_{n=1}^{N} E_r(n) |y_{pred}(n) - 1| y_t(n)$$

where $E_r$ is the relative frame energy which is used as a sample weighting factor. The statistic measures have the following meaning: $c_{tp}$ is the number of true positives, i.e. the number of hits in the SPEECH class, $c_{fp}$ is the number of false positives, i.e. the number of incorrectly classified frames in the MUSIC class, $c_{tn}$ is the number of true negatives, i.e. the number of hits in the MUSIC/NOISE class and $c_{fn}$ is the number of false negatives, i.e. the number of incorrectly classified frames in the SPEECH class.

The above-defined statistics may be used to calculate a true positive rate, commonly referred to as the recall $$TPR = \frac{c_{tp}}{c_{tp} + c_{fn}}$$

and the true negative rate, commonly referred to as the specificity $$TNR = \frac{c_{tn}}{c_{tn} + c_{fp}}$$

The recall TPR and the specificity TNR may be combined into a single number by taking the harmonic mean of TPR and TNR using the following relation:

$$f_{hb} = 2 \frac{TPR \cdot TNR}{TPR + TNR}$$

The result is called the harmonic balanced accuracy.

A value of the decision bias $b_s$ may be found by maximizing the above defined harmonic balanced accuracy achieved with the labels/predictors $y_{pred}(n)$, where $b_s$ is selected from the interval (−2, 2) in successive steps. The spacing of candidate values for the decision bias is approximately logarithmic with higher concentration of values around 0.

The differential score $\text{dlp}(X, b_s)$, calculated with the found value of the decision bias $b_s$, is limited to the range of, for example, (−30.0, +30.0). The differential score $\text{dlp}(X, b_s)$ is reset to 0 when the VAD flag is 0 or when the total frame energy, $E_{tot}$, is lower than 10 dB or when the speech/music classification method is in the ENTRY state 402 and either $f_{att}$ or $f_{out}$ are 1.

2.9 Adaptive Smoother

Referring to FIG. 2, the first stage 250 of the two-stage speech/music classification method comprises an operation 259 of adaptive smoothing. To perform operation 259, the first stage 200 of the two-stage speech/music classification device comprises an adaptive smoother 209.

The adaptive smoother 209 comprises, for example, an adaptive IIR filter to smooth the differential score $\text{dlp}(X, b_s)$ for frame n, identified as dlp(n), from the GMM calculator 208. The adaptive smoothing, filtering operation 259 can be described using the following operation:

$$\text{wdlp}(n) = \text{wght}(n) \cdot \text{wdlp}(n-1) + (1 - \text{wght}(n)) \cdot \text{dlp}(n)$$

where wdlp(n) is the resulting smoothed differential score, wght(n) is a so-called forgetting factor of the adaptive IIR filter, and n represents the frame index.

The forgetting factor is a product of three individual parameters as shown in the following relation:

$$\text{wght}(n) = \text{wrelE}(n) \cdot \text{wdrop}(n) \cdot \text{wrise}(n)$$

The parameter wrelE(n) is linearly proportional to the relative energy of the current frame, $E_r(n)$, and may be calculated using the following relation:

$$wrelE(n) = 0.99 + (E_r(n) + 15)\frac{0.9 - 0.99}{30}$$

The parameter wrelE(n) is limited, for example, to the interval (0.9, 0.99). The constants used in the relation above have the following interpretation. The parameter wrelE(n) reaches the upper threshold of 0.99 when the relative energy is higher than 15 dB. Similarly, the parameter wrelE(n) reaches the lower threshold of 0.9 when the relative energy is lower than −15 dB. The value of the parameter wrelE(n) influences the forgetting factor wght(n) of the adaptive IIR filter of smoother 209. Smoothing is stronger in energetically weak segments where it is expected that the features carry less relevant information about the input signal.

The parameter wdrop(n) is proportional to a derivative of the differential score dlp(n). First, a short-term mean $dlp_{ST}(n)$ of the differential score dlp(n) is calculated using, for example, the following relation:

$$dlp_{ST}(n) = 0.8 \cdot dlp_{ST}(n-1) + 0.2 \cdot dlp(n)$$

The parameter wdrop(n) is set to 0 and is modified only in frames where the following two conditions are met:

$$dlp(n) < 0$$

$$dlp(n) < dlp_{ST}(n)$$

Thus, the adaptive smoother 209 updates the parameter wdrop(n) only when the differential score dlp(n) has decreasing tendency and when it indicates that the current frame belongs to the SPEECH class. In the first frame, when the two conditions are met, and if $dlp_{ST}(n) > 0$, the parameter wdrop(n) is set to $$wdrop(n) = -dlp(n)$$

Otherwise, the adaptive smoother 209 steadily increases the parameter wdrop(n) using, for example, the following relation:

$$wdrop(n) = wdrop(n-1) + (dlp_{ST}(n-1) - dlp(n))$$

If the above defined two conditions are not true, the parameter wdrop(n) is reset to 0. Thus, the parameter wdrop(n) reacts to sudden drops of the differential score dlp(n) below the zero-level indicating potential speech onset. The final value of the parameter wdrop(n) is linearly mapped to the interval of, for example, (0.7, 1.0), as shown in the following relation:

$$wdrop(n) \leftarrow 1.0 + wdrop(n)\frac{0.7 - 1.0}{15}$$

Note that the value of wdrop(n) is "overwritten" in the formula above to simplify notation.

The adaptive smoother 209 calculates the parameter wrise(n) similarly as the parameter wdrop(n) with the difference that it reacts to sudden rises of the differential score dlp(n) indicating potential music onsets. The parameter wrise(n) is set to 0 but is modified in frames where the following conditions are met:

$$f_{SM}(n) = 8 \text{ (ACTIVE)}$$

$$dlp_{ST}(n) > 0$$

$$dlp_{ST}(n) > dlp_{ST}(n-1)$$

Thus, the adaptive smoother 209 updates the parameter wrise(n) only in the ACTIVE state 404 of the input sound signal (See FIG. 4), when the differential score dlp(n) has increasing tendency and when this differential score dlp(n) indicates that the current frame n belongs to the MUSIC class.

In the first frame, when the above three (3) specified conditions are met, and if the short-term mean $dlp_{ST}(n-1) < 0$, the third parameter wrise(n) is set to:

$$wrise(n) = -dlp_{ST}(n)$$

Otherwise, the adaptive smoother 209 steadily increases the parameter wrise(n) according to, for example, the following relation:

$$wrise(n) = wrise(n-1) + (dlp_{ST}(n) - dlp_{ST}(n-1))$$

If the above three (3) conditions are not true, the parameter wrise(n) is reset to 0. Thus, the third parameter wrise(n) reacts to sudden rises of the differential score dlp(n) above the zero-level indicating potential music onset. The final value of the parameter wrise(n) is linearly mapped to the interval of, for example, (0.95, 1.0), as follows:

$$wrise(n) \leftarrow 1.0 + wrise(n)\frac{0.95 - 1.0}{5}$$

Note, that the value of the parameter wrise(n) is "overwritten" in the formula above to simplify notation.

Figure 9:
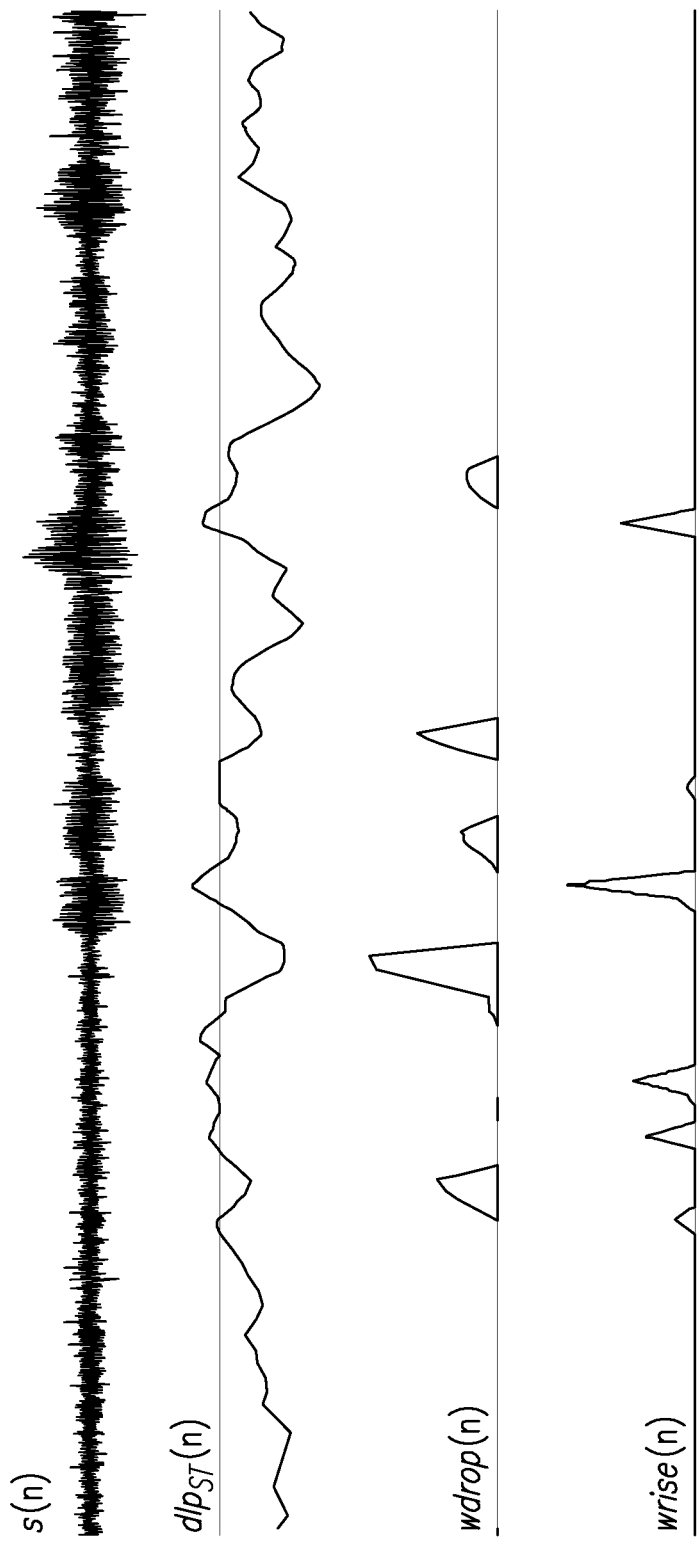
FIG. 9 is a graph showing, as a non-limitative example, the behavior of rising- and dropping-edge detection used to calculate a forgetting factor of an adaptive IIR filter.

FIG. 9 is a graph showing, as a non-limitative example, the behavior of the parameters wdrop(n) and wrise(n) on a short segment of a speech signal with background music. The peaks of the parameter wdrop(n) are usually located near speech onsets whereas the peaks of the parameter wrise(n) are generally located at places where speech slowly backs off and background music starts to dominate the signal content.

The forgetting factor wght(n) of the adaptive IIR filter of the adaptive smoother 209 is decreased in response to strong SPEECH signal content or strong MUSIC signal content. For that purpose, the adaptive smoother 209 analyzes a long-term mean $\bar{\mu}_{dlp}(n)$ and a long-term variance $\bar{\sigma}_{dp}(n)$ of the differential score dlp(n), calculated using, for example, the following relations:

$$\bar{\mu}_{dlp}(n) = 0.9 \cdot \bar{\mu}_{dlp}(n-1) + 0.1 \cdot dlp(n)$$

$$\bar{\sigma}dlp(n) = 0.9 \cdot \bar{\sigma}_{dlp}(n-1) + 0.1 \cdot (dlp(n) - \mu_{dlp}(n))^2$$

In the ENTRY state 402 (FIG. 4) of the input sound signal, the long-term mean $\bar{\mu}_{dlp}(n) = dlp(n)$ and the long-term variance $\bar{\sigma}_{dlp}(n) = 0$. When the absolute value of the differential score dlp(n) is high with low variations around a mean value thereof, there is a good chance that the speech/music classification device has certainty about its content. This can be expressed by the following long-term mean to long-term variance ratio:

$$r_{m2v}(n) = \frac{|\bar{\mu}_{dlp}(n)|}{\sqrt{|\bar{\sigma}_{dlp}(n)|}}$$

The expression $r_{m2v}(n)$ corresponds to a long-term standard deviation of the differential score. The forgetting factor wght(n) of the adaptive IIR filter of the adaptive smoother 259 is decreased in frames where $r_{m2v}(n) > 15$ using, for example, the following relation:

$$\text{wght}(n) \leftarrow 0.9 \cdot \text{wght}(n)$$

The final value of the forgetting factor wght(n) of the adaptive IIR filter of the adaptive smoother 209 is limited to the range of, for example, (0.01, 1.0). In frames where the total frame energy, $E_{tot}(n)$, is below 10 dB, the forgetting factor wght(n) is set to, for example, 0.92. This ensures proper smoothing of the differential score dlp(n) during silence.

The filtered, smoothed differential score, wdlp(n), is a parameter for categorical decisions of the speech/music classification method, as described below.

2.10 State-Dependent Categorical Classifier

Figure 11:
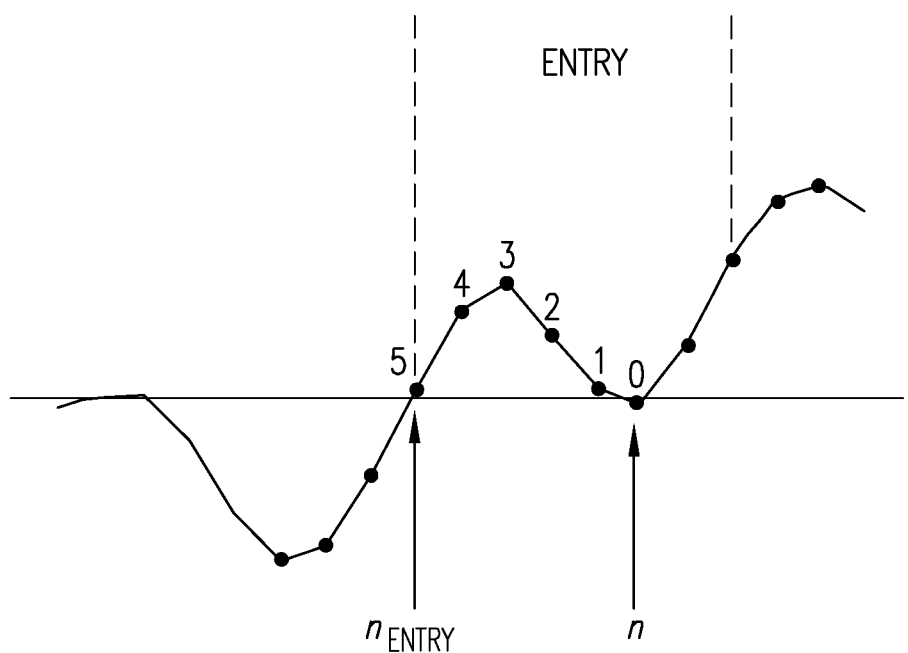
FIG. 11 is a graph illustrating ordering of samples in an ENTRY state during the calculation of weighted average of differential scores.

Referring to FIG. 2, the first stage 250 of the two-stage speech/music classification method comprises an operation 260 of state-dependent categorical classification of the input sound signal in response to differential score distribution and direction-dependent thresholds. To perform operation 260, the first stage 200 of the two-stage speech/music classification device comprises a state-dependent categorical classifier 210.

weighted average of differential score, dlp(n) calculated in frames belonging to the ENTRY state 402 and preceding the current frame. The weighted average may be calculated using the following relation:

$$wdlp_{ENTRY}(n) = \sum_{k=0}^{n-n_{ENTRY}} \alpha_k(n - n_{ENTRY}) \cdot dlp(n-k) \text{ for } n = n_{ENTRY},$$

$$\ldots, n_{ENTRY} + 7$$

where $n_{ENTRY}$ marks the beginning (frame) of the ENTRY state 402 and $a_k(n-n_{ENTRY})$ are the weights corresponding to the samples of dlp(n) in the ENTRY state. Thus, the number of samples used in the weighted average $wdlp_{ENTRY}(n)$ ranges from 0 to 7 depending on the position of the current frame with respect to the beginning (frame) of the ENTRY state. This is illustrated in FIG. 11 showing a graph illustrating sorting of the weights in decreasing order such that the most recent frame is associated with the highest weight. The following Table 2 shows an example of weights that can be used for such averaging.

TABLE 2

| | Weights used for averaging in the ENTRY state | | | | | | | |
|---|---|---|---|---|---|---|---|---|
| $n - n_{ENTRY}$ | α0 | α1 | α2 | α3 | α4 | α5 | α6 | α7 |
| 0 | 1 | | | | | | | |
| 1 | 0.6 | 0.4 | | | | | | |
| 2 | 0.47 | 0.33 | 0.2 | | | | | |
| 3 | 0.4 | 0.3 | 0.2 | 0.1 | | | | |
| 4 | 0.3 | 0.25 | 0.2 | 0.15 | 0.1 | | | |
| 5 | 0.233 | 0.207 | 0.18 | 0.153 | 0.127 | 0.1 | | |
| 6 | 0.235 | 0.205 | 0.174 | 0.143 | 0.112 | 0.081 | 0.05 | |
| 7 | 0.2 | 0.179 | 0.157 | 0.136 | 0.114 | 0.093 | 0.071 | 0.05 |

The operation 260 is the final operation of the first stage 250 of the two-stage speech/music classification method and comprises a categorization of the input sound signal into the following three final classes:

SPEECH/NOISE (0)
UNCLEAR (1)
MUSIC (2)

Figure 10:
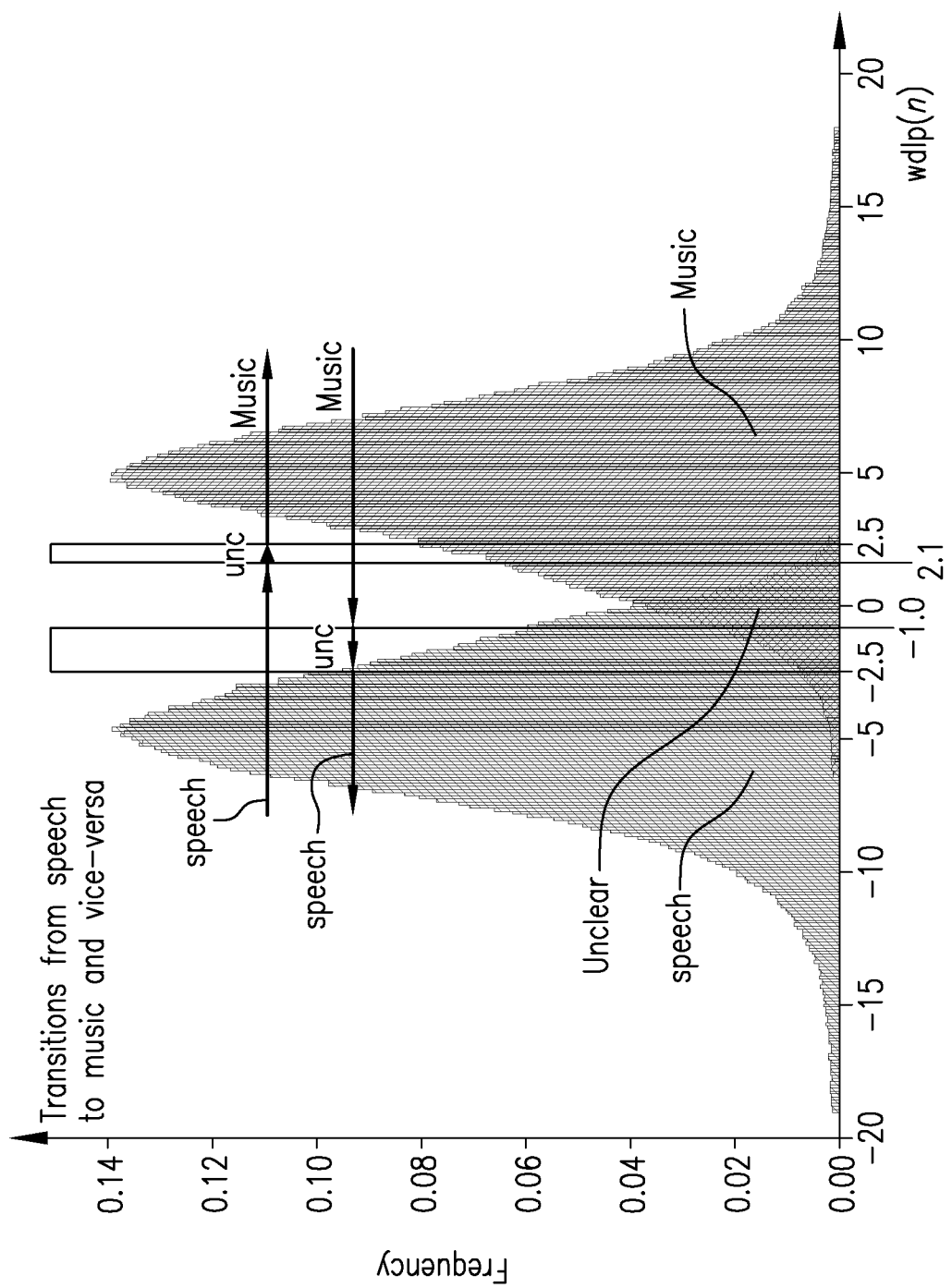
FIG. 10 is a graph illustrating the distribution of smoothed differential scores wdlp(n) of the training database and thresholds for transitioning between SPEECH/NOISE, UNCLEAR and MUSIC classes.

In the above, numbers in parentheses are the numeric constants associated with the three final classes. The above set of classes is slightly different than the classes that have been discussed so far in relation to the differential score. The first difference is that the SPEECH class and the NOISE class are combined. This is to facilitate the core encoder selection mechanism (described in the following description) in which an ACELP encoder core is usually selected for coding both speech signals and background noise. A new class has been added to the set, namely the UNCLEAR final class. Frames falling into this category are usually found in speech segments with a high level of additive background music. The smoothed differential scores wdlp(n) of frames in class UNCLEAR are mostly close to 0. FIG. 10 is a graph illustrating the distribution of smoothed differential scores wdlp(n) of the training database and their relation to the final classes SPEECH/NOISE, UNCLEAR and MUSIC.

Let $d_{SMC}(n)$ denote the final class selected by the state-dependent categorical classifier 210.

When the input sound signal is, in the current frame, in the ENTRY state 402 (See FIG. 4), the state-dependent categorical classifier 210 selects the final class $d_{SMC}(n)$ based on a If the absolute frame energy, $E_{tot}$, is, in the current frame, lower than, for example, 10 dB, the state-dependent categorical classifier 210 sets the final class $d_{SMC}(n)$ to SPEECH/NOISE regardless of the differential score dlp(n). This is to avoid misclassifications during silence.

If the weighted average of differential scores in the ENTRY state $wdlp_{ENTRY}(n)$ is less than, for example, 2.0, the state-dependent categorical classifier 210 sets the final class $d_{SMC}(n)$ to SPEECH/NOISE.

If the weighted average of differential scores in the ENTRY state $wdlp_{ENTRY}(n)$ is higher than, for example, 2.0, the state-dependent categorical classifier 210 sets the final class $d_{SMC}(n)$ based on the non-smoothed differential score dlp(n) in the current frame. If dlp(n) is higher than, for example, 2.0, the final class is MUSIC. Otherwise, it is UNCLEAR.

In the other states (See FIG. 4) of the input sound signal, the state-dependent categorical classifier 210 selects in the current frame the final class based on the smoothed differential score wdlp(n) and the final class selected in the previous frame. The final class in the current frame is first initialized to the class from the previous frame, i.e $$d_{SMC}(n) = d_{SMC}(n-1)$$

The decision can be changed by the state-dependent categorical classifier 210 if the smoothed differential score wdlp(n) crosses a threshold of class (See Table 3) that is different from the class selected in the previous frame. These transitions between classes are illustrated in FIG. 10. For example, if the final class $d_{SMC}(n)$ selected in the previous frame was SPEECH/NOISE and the smoothed differential score wdlp(n) in the current frame is higher than, for example, 1.0, the final class $d_{SMC}(n)$ in the current frame will be changed to UNCLEAR. The graph of FIG. 10 shows the histograms of the smoothed differential score$_s$ wdlp(n) for the SPEECH/NOISE final class and the MUSIC final class calculated on the training database, excluding INACTIVE frames. A$_s$ can be seen from the graph of FIG. 10, there are two sets of thresholds, one for SPEECH/NOISE->UNCLEAR->MUSIC transition and the other for the opposite direction, i.e. MUSIC->UNCLEAR->SPEECH/NOISE transition. There is no switching of the final class $d_{SMC}(n)$ directly from SPEECH to MUSIC or vice-versa. The values of the decision thresholds indicate that the state-dependent categorical classifier 210 favors the SPEECH/NOISE final class. The transitions between classes and examples of associated thresholds are summarized in the following Table 3.

TABLE 3

Thresholds for class transitions

| FROM | TO | | |
|---|---|---|---|
| | SPEECH | UNCLEAR | MUSIC |
| SPEECH/NOISE | | >2.1 | |
| UNCLEAR | <−2.5 | | >2.5 |
| MUSIC | | <−1.0 | |

As mentioned herein above, the transitions between classes are driven not only by the value of the smoothed differential score wdlp(n) but also by the final classes selected in the previous frames. A complete set of rules for transitions between the classes is shown in the class transition diagram of FIG. 12.

Figure 12:
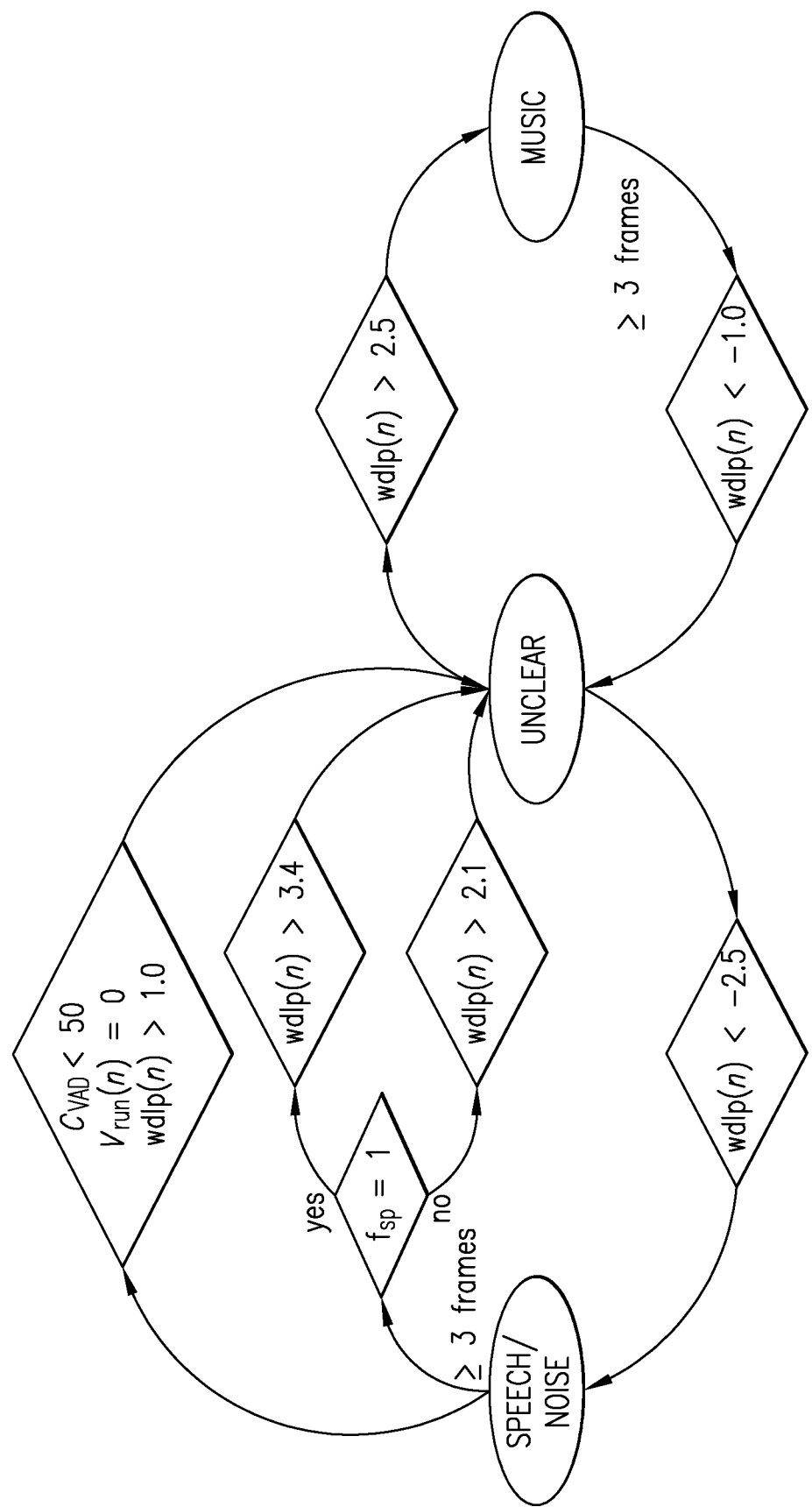
FIG. 12 is a class transition diagram illustrating a complete set of rules for transitions between the classes SPEECH/NOISE, UNCLEAR and MUSIC.

The arrows in FIG. 12 indicate the direction in which the class may be changed if the condition(s) inside the corresponding rhomb is satisfied. In case of multiple conditions in a rhomb, a logical AND is assumed between them, i.e. all must be fulfilled for the transition to occur. If an arrow is conditioned by the notation "≥X frames", it means that the class may be changed only after at least X frames. This adds a short hysteresis to some transitions.

In FIG. 12, the symbol $f_{sp}$ denotes a short pitch flag which is a by-product of the stable high-pitch analysis module of the IVAS codec (See Reference [1]). The short pitch flag is set to 1 in pre-selected active frames showing a high value of the voicing measure, $\overline{R}_{xy3}(n)$. The voicing measure is calculated as the average normalized correlation over three adjacent half-frames of the current frame as follows $$\overline{R}_{xy3}(n) = \frac{1}{3}\sum_{k=0}^{2}c_{norm}^{[k]}(n)$$

where $C_{norm}^{[k]}(n)$ is the normalized autocorrelation function in the current frame and the upper index [k] refers to the position of the half-frame window. The normalized autocorrelation function is computed as part of the open-loop pitch analysis module of the IVAS codec (See Reference [1], Section 5.1.11.3.2).

The short pitch flag $f_{sp}$ may be set in the pre-selected frames as follows $$f_{sp} = \begin{cases} 1 & VAD = 1 \text{ AND } \overline{R}_{SHPLT}(n) > 0.65 \text{ AND } \overline{R}_{SHPLT}(n) > 0.7\overline{R}_{xy3LT}(n) \\ 0 & \text{otherwise} \end{cases}$$

where $\overline{R}_{SHPLT}(n)$ is the long-term measure of the maximum high-pitch correlation value in the current frame (see Reference [1]) and $\overline{R}_{xy3\_LT}$ is the long-term voicing measure in the current frame. The long-term measures, $\overline{R}_{SHPLT}(n)$ and $\overline{R}_{xy3LT}(n)$, may be calculated using the following relations:

$$\overline{R}_{SHPLT}(n)=0.75\overline{R}_{SHPLT}(n-1)+0.25\overline{R}_{SHP}(n)$$

$$\overline{R}_{xy3LT}(n)=0.75\overline{R}_{xy3LT}(n-1)+0.25\overline{R}_{xy3}(n)$$

and $\overline{R}_{SHP}(n)$ is the maximum high-pitch correlation value computed as part of the stable high-pitch analysis module of the IVAS codec (See Reference [1]).

In FIG. 12, the parameter $c_{VAD}$ is a counter of ACTIVE frames. The counter $c_{VAD}$ is initialized to zero and reset to zero in all frames where the VAD flag is 0. The counter $c_{VAD}$ is increased by one only in frames where the VAD flag is 1 until it reaches the threshold of, for example, 50 or until the VAD flag goes back to zero.

The parameter $v_{run}(n)$ is defined in Section 2.2 (Onset/attack detection) of the present disclosure.

3. Core Encoder Selection

FIG. 3 is a schematic block diagram illustrating concurrently the second stage 300 of the two-stage speech/music classification device and the second stage 350 of the corresponding two-stage speech/music classification method.

In the second stage 350/300 of the two-stage speech/music classification method and device, the final class $d_{SMC}(n)$ selected by the state-dependent categorical classifier 210 is "mapped" into one of the three core encoder technologies of the IVAS codec, i.e. ACELP (Algebraic Code-Excited Linear Prediction), GSC (Generic audio Signal Coding) or TCX (Transform-Coded eXcitation). This is referred to as the three-way classification. This does not guarantee that the selected technology will be used as core encoder since there exist other factors affecting the decision such as bit-rate or bandwidth limitations. However, for common types of input sound signals the initial selection of core encoder technology is used.

Besides the class $d_{SMC}(n)$ selected by the state-dependent categorical classifier 210 in the first stage, the core encoder selection mechanism takes into consideration some additional high-level features.

3.1 Additional High-Level Features Extractor

Referring to FIG. 3, the second stage 350 of the two-stage speech/music classification method comprises an operation 351 of extraction of additional high-level features of the input sound signal. To perform operation 351, the second stage 300 of the two-stage speech/music classification device comprises an additional high-level features extractor 301.

In the first stage 200/250 of the two-stage speech/music classification device and method, most features are usually calculated on short segments (frames) of the input sound signal not exceeding 80 ms. This allows for a quick reaction to events such as speech onsets or offsets in the presence of background music. However, it also leads to a relatively high rate of misclassifications. The misclassifications are mitigated to some extent by means of adaptive smoothing, described in above Section 2.9 but for certain types of signal this is not sufficiently efficient. Therefore, as part of the second stage 300/350 of the two-stage speech/music classification device and method, the class $d_{SMC}(n)$ can be altered in order to select the most appropriate core encoder technology for certain types of signal. To detect such types of signal, the detector calculates additional high-level features and/or flags, usually on longer segments of the input signal.

3.1.1 Long-Term Signal Stability

Long-term signal stability is a feature of the input sound signal that can be used for successful discrimination between vocal music from opera. In the context of core encoder selection, signal stability is understood as long-term stationarity of segments with high autocorrelation. The additional high-level features extractor 301 estimates the long-term signal stability feature based on the "voicing" measure, $\bar{R}_{xy3}(n)$. Long-term signal stability may be estimated in the current frame n using a variance $cor_{var}(n)$ of the voicing parameter $\bar{R}_{xy3}(n)$ calculated over a number of, for example, 10 frames, using the following relations:

$$\bar{R}_{xy10} = \frac{1}{10}\sum_{k=1}^{10}\bar{R}_{xy3}(n-k)$$

$$cor_{var}(n) = \frac{1}{10}\sum_{k=1}^{10}(\bar{R}_{xy3}(n-k) - \bar{R}_{xy10})^2$$

In the equation above, $\bar{R}_{xy10}$ is the mean voicing over the number of 10 frames.

For higher robustness, the voicing parameter $\bar{R}_{xy3}(n)$ in the current frame n is smoothed using an IIR filter according to, for example, the following formula:

$$cor_{LT}(n) = 0.9 \cdot cor_{LT}(n-1) + 0.1 \cdot \bar{R}_{xy3}(n)$$

If the smoothed voicing parameter $cor_{LT}(n)$ is sufficiently high and the variance $cor_{var}(n)$ of the voicing parameter is sufficiently low, then the input signal is considered as "stable" for the purposes of core encoder selection. This is measured by comparing the values, $cor_{LT}(n)$ and $cor_{var}(n)$, to predefined thresholds and setting a binary flag using, for example, the following rules:

$$f_{STAB}(n) = \begin{cases} 1 & \text{if } cor_{var}(n) < 0.0005 \text{ and } cor_{LT}(n) > 0.8 \\ 0 & \text{otherwise} \end{cases}$$

The binary flag, $f_{STAB}(n)$, is an indicator of long-term signal stability and it is used in the core encoder selection discussed later in the present disclosure.

3.1.2 Segmental Attack Detection

Figure 13:
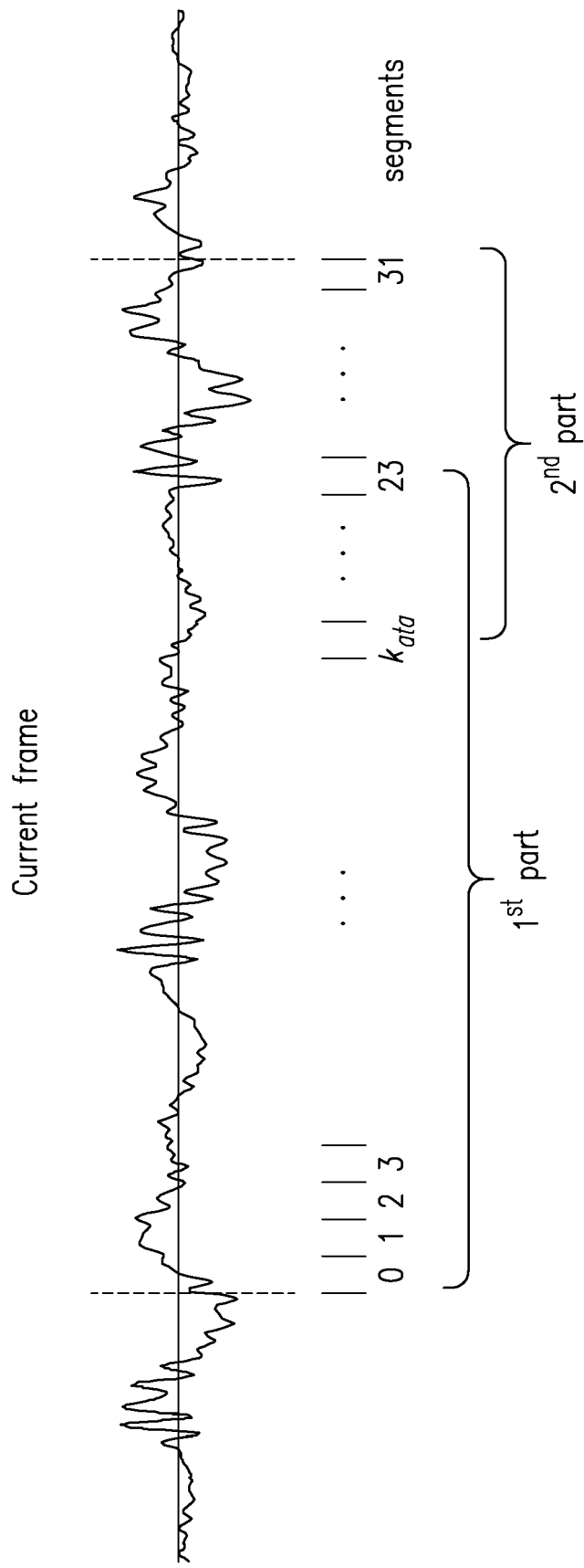
FIG. 13 is a schematic diagram illustrating segmental attack detection performed on a number of short segments in a current frame of the input sound signal.

The extractor 301 extracts the segmental attack feature from a number, for example 32, of short segments of the current frame n as illustrated in FIG. 13.

In each segment, the additional high-level features extractor 301 calculates the energy $E_{ata}(k)$ using, for example, the following relation:

$$E_{ata}(k) = \sum_{i=0}^{7} s(n + 8k + i)^2, k = 0, \ldots, 31$$

where s(n) is the input sound signal in the current frame n, k is the index of the segment, and i is the index of the sample in the segment. Attack position is then calculated as the index of the segment with the maximum energy, as follows:

$$k_{ata} = \max_{k}(E_{ata}(k))$$

The additional high-level features extractor 301 estimates the strength $str_{ata}$ of the attack by comparing the mean (numerator of the below relation) of the energy $E_{ata}(k)$ of the input sound signal s(n) from the attack (segment $k=k_{ata}$) to the end (segment 31) of the current frame n against the mean (denominator of the below relation) of the energy $E_{ata}(k)$ of the input signal s(n) from the beginning (segment 0) to 3/4 (Segment 24) of the current frame n. This estimation of the strength $str_{ata}$ is made using, for example, the following relation:

$$str_{ata} = \frac{\frac{1}{31 - k_{ata}}\sum_{k=k_{ata}}^{31}E_{ata}(k)}{\frac{1}{24}\sum_{k=0}^{23}E_{ata}(k)}$$

If the value $str_{ata}$ is higher than, for example, 8, then the attack is considered strong enough and the segment $k_{ata}$ is used as an indicator for signaling the position of the attack inside the current frame n. Otherwise, indicator $k_{ata}$ is set to 0 indicating that no attack was identified. The attacks are detected only in GENERIC frame types which is signaled by the IVAS frame type selection logic (See Reference [1]). To reduce false attack detections, the energy $E_{ata}(k_{ata})$ of segment $k=k_{ata}$ where the attack was identified is compared ($str_{3\_4}(k)$) to energies $E_{ata}(k)$ of segments in the first % of the current frame n (segments 2 to 21), using, for example, the following relation:

$$str_{3\_4}(k) = \frac{E_{ata}(k_{ata})}{E_{ata}(k)}, k = 2, \ldots, 21$$

If any of the comparison values $str_{3\_4}(k)$ for segments $k=2, \ldots, 21$ is less than, for example, 2, $k \neq k_{ata}$, then $k_{ata}$ is set to 0 indicating that no attack was identified. In other words, the energy of the segment containing the attack must be at least twice as high as the energy of other segments in the first % of the current frame.

The mechanism described above ensures that attacks are detected mainly in the last % of the current frame which makes them suitable for encoding either with the ACELP technology or the GSC technology.

For unvoiced frames, classified as UNVOICED_CLAS, UNVOICED_TRANSITION or ONSET by the IVAS FEC classification module (See Reference [1]), the additional high-level features extractor 301 estimates the strength $str_{ata}$ of the attack by comparing the energy $E_{ata}(k_{ata})$ of the attack segment $k=k_{ata}$ (numerator of the below relation) to the mean (denominator of the below relation) of the energy $E_{ata}(k)$ in the previous 32 segments preceding the attack, using, for example, the relation:

$$str_{ata} = \frac{E_{ata}(k_{ata})}{\frac{1}{32}\sum_{k=0}^{31}E_{ata}(k + k_{ata} - 32)}$$

In the above relation, negative indices in the denominator refer to the values of segmental energies $E_{ata}(k)$ in the previous frame. If the strength $str_{ata}$, calculated with the formula above, is higher than, for example, 16 the attack is sufficiently strong and $k_{ata}$ is used for signaling the position of the attack inside the current frame. Otherwise, $k_{ata}$ is set to 0 indicating that no attack was identified. In case the last frame was classified as UNVOICED_CLAS by the IVAS FEC classification module, then the threshold is set to, for example, 12 instead of 16.

For unvoiced frames, classified as UNVOICED_CLAS, UNVOICED_TRANSITION or ONSET by the IVAS FEC classification module (See Reference [1]), there is another condition to be satisfied to consider the detected attack as sufficiently strong. The energy $E_{ata}(k)$ of the attack must be sufficiently high when compared to a long-term mean energy $\overline{E_{ata}}(n)$, that may be calculated as follows:

$$\overline{E_{ata}}(n) = 0.95 \cdot \overline{E_{ata}}(n-1) + 0.05 \cdot \frac{1}{32}\sum_{k=0}^{31} E_{ata}(k)$$

with $\overline{E_{ata}}(0)=0$. The attack is sufficiently strong if, for example, the ratio:

$$str_{a2mn} = \frac{E_{ata}(k_{ata})}{\overline{E_{ata}}(n)}$$

is higher than 20. Otherwise, $k_{ata}$ is set to 0 indicating that no attack was identified.

In the case an attack has been already detected in the previous frame, $k_{ata}$ is reset to 0 in the current frame n preventing attack smearing effects.

For the other frame types (excluding UNVOICED and GENERIC as described above), the additional high-level features extractor 301 compares the energy $E_{ata}(k_{ata})$ of the segment $k=k_{ata}$ containing an attack against energies $E_{ata}(k)$ in the other segments in accordance with, for example, the following ratio:

$$str_{other}(k) = \frac{E_{ata}(k_{ata})}{E_{ata}(k)}, k = 2, \ldots, 21 \text{ and } k \neq k_{ata}$$

and if any of the comparison values $str_{other}(k)$ for $k=2, \ldots, 21$, $k \neq k_{ata}$ is lower than, for example, 1.3, then the attack is considered weak and $k_{ata}$ is set to 0. Otherwise, segment $k_{ata}$ is used for signaling the position of the attack inside the current frame.

Thus, the final output of the additional high-level features detector 301 regarding segmental attack detection is the index $k=k_{ata}$ of the segment containing the attack or $k_{ata}=0$. If the index is positive, an attack is detected. Otherwise, no attack is identified.

3.1.3 Signal Tonality Estimation

Tonality of the input sound signal in the second stage of the two-stage speech/music classification device and method is expressed as a tonality binary flag reflecting both spectral stability and harmonicity in the lower frequency range of the input signal up to 4 kHz. The additional high-level features extractor 301 calculates this tonality binary flag from a correlation map, $S_{map}(n, k)$, which is a by-product of the tonal stability analysis in the IVAS encoder (See Reference [1]).

The correlation map is a measure of both signal stability and harmonicity. The correlation map is calculated from the first, for example, 80 bins of the residual energy spectrum in the logarithmic domain, $E_{dB,res}(k), k=0, \ldots, 79$ (See Reference [1]). The correlation map is calculated in segments of the residual energy spectrum where peaks are present. These segments are defined by the parameter $i_{min}(p)$ where $p=1, \ldots, N_{min}$ is the segment index and $N_{min}$ is the total number of segments.

Let's define the set of indices belonging to a particular segment x as $$PK(p)=\{i | i \geq i_{min}(p), \text{ and } i < i_{min}(p+1), \text{ and } i < 80\}$$

Then, the correlation map may be calculated as follows $$M_{cor}(PK(p)) = \frac{\left(\sum_{i \in PK(p)} E_{dB,res}(i) E_{dB,res}^{[-1]}(i)\right)^2}{\sum_{i \in PK(p)}(E_{dB,res}(i))^2 \sum_{i \in PK(p)}(E_{dB,res}^{[-1]}(i))^2},$$

$$p = 1, \ldots, N_{min}$$

The correlation map $M_{cor}(PK(p))$ is smoothed with an IIR filter and summed across the bins in the frequency range $k=0, \ldots, 79$ to yield a single number, using, for example, the following two relations:

$$\overline{M_{cor}}(n, k) = \beta(n) \cdot \overline{M_{cor}}(n-1, k) + (1 - \beta(n)) \cdot M_{cor}(n, k) k = 0,$$

$$\ldots, 79$$

$$S_{mass} = \frac{1}{80}\sum_{k=0}^{79}\overline{M_{cor}}(n, k)$$

where n denotes the current frame and k denotes the frequency bin. The weight $\beta(n)$ used in the equation above is called the soft VAD parameter. It is initialized to 0 and may be updated in each frame as $$\beta(n)=0.95 \cdot \beta(n-1)+0.05 \cdot f_{VAD}(n)$$

where $f_{VAD}(n)$ is the binary VAD flag from the IVAS encoder (See Reference [1]). The weight $\beta(n)$ is limited to the range of, for example, (0.05, 0.95). The extractor 301 sets the tonality flag $f_{ton}$ by comparing $S_{mass}$ with an adaptive threshold, $thr_{mass}$. The threshold $thr_{mass}$ is initialized to, for example, 0.65 and incremented or decremented in steps of, for example, 0.01 in each frame. If $S_{mass}$ is higher than 0.65, then the threshold $thr_{mass}$ is increased by 0.01, otherwise it is decreased by 0.01. The threshold $thr_{mass}$ is upper limited to, for example, 0.75 and lower limited to, for example, 0.55. This adds a small hysteresis to the tonality flag $f_{ton}$.

The tonality flag, $f_{ton}$, is set to 1 if $S_{mass}$ is higher than $thr_{mass}$. Otherwise, it is set to 0.

3.1.4 Spectral Peak-to-Average Ratio

Another high-level feature used in the core encoder selection mechanism is the spectral peak-to-average ratio. This feature is a measure of spectral sharpness of the input sound signal s(n). The extractor 301 calculates this high-level feature from the power spectrum of the input signal s(n) in logarithmic domain, $S_{LT}(n, k), k=0, \ldots, 79$, for example in the range from 0 to 4 kHz. However, the power spectrum $S_{LT}(n, k)$ is first smoothed with an IIR filter using, for example, the following relation:

$$\overline{S_{LT}}(n,k)=0.9 \cdot \overline{S_{LT}}(n-1,k)+0.1 \cdot S_{LT}(n,k), k=0, \ldots, 79$$

where n denotes the current frame and k denotes the frequency bin. The spectral peak-to-average ratio is calculated using, for example, the following relation:

$$r_{p2a}(n) = \max_k(\overline{S_{LT}}(n,k)) - \frac{1}{80}\sum_{k=0}^{79}\overline{S_{LT}}(n,k)$$

3.2 Core Encoder Initial Selector

Referring to FIG. 3, the second stage 350 of the two-stage speech/music classification method comprises an operation 352 of initial selection of the core encoder. To perform operation 352, the second stage 300 of the two-stage speech/music classification device comprises a core encoder initial selector 302.

The initial selection of the core encoder by the selector 302 is based on (a) the relative frame energy $E_r$, (b) the final class $d_{SMC}(n)$ selected in the first stage of the two-stage speech/music classification device and method and (c) the additional high-level features $r_{p2a}(n)$, $S_{mass}$, and $thr_{mass}$ as described herein above. The selection mechanism used by the core encoder initial selector 302 is depicted in the schematic diagram of FIG. 14.

Figure 14:
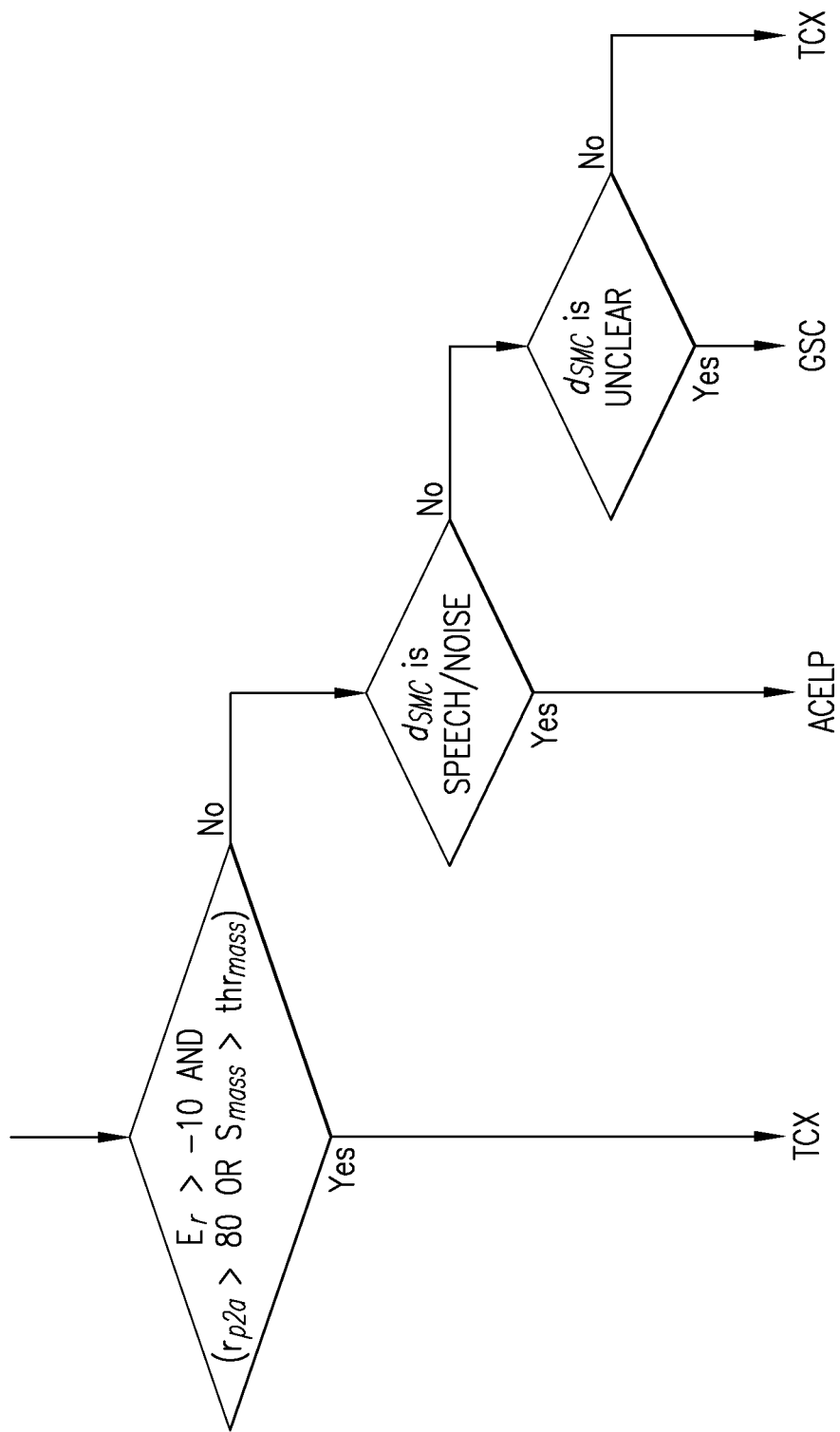
FIG. 14 is a schematic diagram depicting a mechanism of initial selection of a core encoder used by a core encoder initial selector of the second stage of the two-stage speech/music classification device of FIG. 3.

Let $d_{core} \in \{0, 1, 2\}$ denote the core encoder technology selected by the mechanism in FIG. 14, with "0" representing the ACELP technology, "1" representing the GSC technology and "2" representing the TCX technology. Thus, the initial selection of the core encoder technology closely follows the final class $d_{SMC}(n)$ assignment from the first stage of the two-stage speech/music classification device and method. The exception is related to strongly tonal signals for which the TCX technology is selected as it provides better quality.

3.3 Core Encoder Selection Refiner

Referring to FIG. 3, the second stage 350 of the two-stage speech/music classification method comprises an operation 353 of refinement of the initial selection of core encoder. To perform operation 353, the second stage 300 of the two-stage speech/music classification device comprises a core encoder selection refiner 303.

The core encoder selection refiner 303 may change the core encoder technology when $d_{core}=1$, i.e. when the GSC core encoder is initially selected for core coding. This situation can happen for example for musical items classified as MUSIC with low energy below 400 Hz. The affected segments of the input signal may be identified by analyzing the following energy ratio:

$$rat_{LF} = \frac{10 \cdot \log\left(\frac{1}{8}\sum_{k=0}^{7}E_{bin}(k)\right)}{E_{tot}}$$

where $E_{bin}(k)$, k=0, . . . , 127 is the power spectrum per frequency bin k of the input signal in linear domain and $E_{tot}$ is the total energy of the signal segment (frame).

The summation in the numerator extends over the first 8 frequency bins of the energy spectrum corresponding to a frequency range of 0 to 400 Hz. The core encoder selection refiner 303 calculates and analyzes the energy ratio $rat_{LF}$ in frames previously classified as MUSIC with a reasonably high accuracy. The core encoder technology is changed from GSC to ACELP under, for example, the following condition:

$$d_{core} \leftarrow \begin{cases} 0 & \text{if } d_{core} = 1 \text{ AND } rat_{LF} < 0.18 \text{ AND } dlp_{ST}(n) > 15.0 \\ 1 & \text{otherwise} \end{cases}$$

For signals with very short and stable pitch period, GSC is not the optimal core coder technology. Therefore, as a non-limitative example, when $f_{sp}=1$, the core encoder selection refiner 303 changes the core encoder technology from GSC to ACELP or TCX as follows:

$$\leftarrow \begin{cases} 0 & \text{if } d_{core} = 1 \text{ AND } f_{sp} = 1 \text{ AND } wdlp(n) < 2.58 \\ 2 & \text{if } d_{core} = 1 \text{ AND } f_{sp} = 1 \text{ AND } wdlp(n) \geq 2.58 \\ 1 & \text{otherwise} \end{cases}$$

Highly correlated signals with low energy variation are another type of signals for which the GSC core encoder technology is not suitable. For these signals, the core encoder selection refiner 303 switches the core encoder technology from GSC to TCX. As a non-limitative example, this change of core encoder is made when the following conditions are met:

$$d_{core} \leftarrow \begin{cases} 2 & \text{if } d_{core} = 1 \text{ AND } f_{STAB}(n) = 1 \text{ AND } T_{OL}^{[0]} \geq 130 \\ 1 & \text{otherwise} \end{cases}$$

where $T_{OL}^{[0]}$ is the absolute pitch value from the first half-frame of the open-loop pitch analysis (See Reference [1]) in current frame n.

Finally, in a non-limitative example, the core encoder selection refiner 303 may change the initial core encoder selection from GSC to ACELP in frames where an attack is detected, provided the following condition is fulfilled:

$$f_{no\_GSC} = \begin{cases} 1 & \text{if } d_{core} = 1 \text{ AND} \\ & E_{tot}(n) - E_{tot}(n-1) > 4.5 \text{ AND} \\ & E_{tot}(n) - 2 \cdot E_{tot}(n-1) + E_{tot}(n-2) > 10.0 \\ 0 & \text{otherwise} \end{cases}$$

The flag $f_{no\_GSC}$ is an indicator that the change of the core encoder technology is enabled.

The condition above ensures that this change of core encoder from GSC to ACELP happens only in segments with rising energy. If the condition above is fulfilled and, at the same time, a transition frame counter $TC_{cnt}$ has been set to 1 in the IVAS codec (Reference [1]), then the core encoder selection refiner 303 changes the core encoder to ACELP. That is:

$$d_{core} \leftarrow \begin{cases} 0 & \text{if } f_{no\_GSC} = 1 \text{ AND } TC_{cnt} = 1 \\ 1 & \text{otherwise} \end{cases}$$

Additionally, when the core encoder technology is changed to ACELP the frame type is set to TRANSITION. This means that the attack will be encoded with the TRANSITION mode of the ACELP core encoder.

If an attack is detected by the segmental attack detection procedure of the additional high-level features detection operation 351, as described in section 3.1.2 above, then the index (position) of this attack, $k_{ata}$, is further examined. If the position of the detected attack is in the last sub-frame of frame n, then the core encoder selection refiner 303 changes the core encoder technology to ACELP, for example when the following conditions are fulfilled:

$$d_{core} \leftarrow \begin{cases} 0 & \text{if } f_{no\_GSC} = 1 \text{ AND } TC_{cnt} \neq 1 \text{ AND } k_{ata} > 24 \\ 1 & \text{otherwise} \end{cases}$$

Additionally, when the core encoder technology is changed to ACELP the frame type is set to TRANSITION and a new attack "flag" $f_{ata}$ is set as follows $f_{ata} = k_{ata} + 1$ This means that the attack will be encoded with the TRANSITION mode of the ACELP core encoder.

If the position of the detected attack is not located in the last sub-frame but at least beyond the first quarter of the first sub-frame, then the core encoder selection is not changed and the attack will be encoded with the GSC core encoder. Similarly to the previous case, a new attack "flag" $f_{ata}$ may be set as follows:

$f_{ata} = k_{ata} + 1$ if $f_{no\_GSC} = 1$ AND $TC_{cnt} \neq 1$ AND $k_{ata} > 4$ The parameter $k_{ata}$ is intended to reflect the position of the detected attack, so the attack flag $f_{ata}$ is somewhat redundant. However, it is used in the present disclosure for consistency with other documents and with the source code of the IVAS codec.

Finally, core encoder selection refiner 303 changes the frame type from GENERIC to TRANSITION in speech frames for which the ACELP core coder technology has been selected during the initial selection. This situation happens only in active frames where the local VAD flag has been set to 1 and in which an attack has been detected by the segmental attack detection procedure of the additional high-level features detection operation 351, described in section 3.1.2, i.e. where $k_{ata} > 0$.

The attack flag is then similar as in the previous situation. That is:

$f_{ata} = k_{ata} + 1$

4. Example Configuration of Hardware Component

Figure 15:
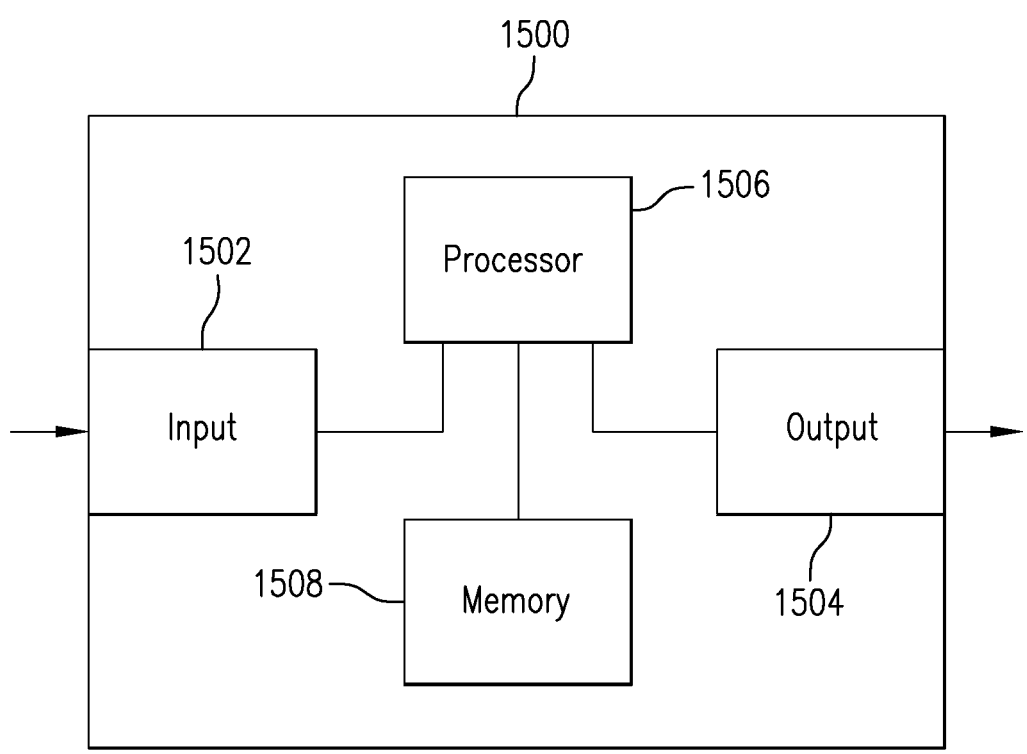
FIG. 15 is a simplified block diagram of an example configuration of hardware components implementing the sound codec, including the two-stage speech/music classification device and method.

FIG. 15 is a simplified block diagram of an example configuration of hardware components forming the above described IVAS codec, including the two-stage speech/music classification device.

The IVAS codec, including the two-stage speech/music classification device may be implemented as a part of a mobile terminal, as a part of a portable media player, or in any similar device. The IVAS codec, including the two-stage speech/music classification device (identified as 1500 in FIG. 15) comprises an input 1502, an output 1504, a processor 1506 and a memory 1508.

The input 1502 is configured to receive the input sound signal s(n), for example the left and right channels of an input stereo sound signal in digital or analog form in the case of the encoder of the IVAS codec. The output 1504 is configured to supply an encoded multiplexed bit-stream in the case of the encoder of the IVAS codec. The input 1502 and the output 1504 may be implemented in a common module, for example a serial input/output device.

The processor 1506 is operatively connected to the input 1502, to the output 1504, and to the memory 1508. The processor 1506 is realized as one or more processors for executing code instructions in support of the functions of the various elements and operations of the above described IVAS codec, including the two-stage speech/music classification device and method as shown in the accompanying figures and/or as described in the present disclosure.

The memory 1508 may comprise a non-transient memory for storing code instructions executable by the processor 1506, specifically, a processor-readable memory storing non-transitory instructions that, when executed, cause a processor to implement the elements and operations of the IVAS codec, including the two-stage speech/music classification device and method. The memory 1508 may also comprise a random access memory or buffer(s) to store intermediate processing data from the various functions performed by the processor 1506.

Those of ordinary skill in the art will realize that the description of the IVAS codec, including the two-stage speech/music classification device and method are illustrative only and are not intended to be in any way limiting. Other embodiments will readily suggest themselves to such persons with ordinary skill in the art having the benefit of the present disclosure. Furthermore, the disclosed IVAS codec, including the two-stage speech/music classification device and method may be customized to offer valuable solutions to existing needs and problems of encoding and decoding sound, for example stereo sound.

In the interest of clarity, not all of the routine features of the implementations of the IVAS codec, including the two-stage speech/music classification device and method are shown and described. It will, of course, be appreciated that in the development of any such actual implementation of the IVAS codec, including the two-stage speech/music classification device and method, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound processing having the benefit of the present disclosure.

In accordance with the present disclosure, the elements, processing operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations and sub-operations is implemented by a processor, computer or a machine and those operations and sub-operations may be stored as a series of non-transitory code instructions readable by the processor, computer or machine, they may be stored on a tangible and/or non-transient medium.

Elements and processing operations of the IVAS codec, including the two-stage speech/music classification device and method as described herein may comprise software, firmware, hardware, or any combination(s) of software, firmware, or hardware suitable for the purposes described herein.

In the IVAS codec, including the two-stage speech/music classification device and method, the various processing operations and sub-operations may be performed in various orders and some of the processing operations and sub-operations may be optional.

Although the present disclosure has been described hereinabove by way of non-restrictive, illustrative embodiments thereof, these embodiments may be modified at will within the scope of the appended claims without departing from the spirit and nature of the present disclosure.

REFERENCES

The present disclosure mentions the following references, of which the full content is incorporated herein by reference:
[1] 3GPP TS 26.445, v.12.0.0, "Codec for Enhanced Voice Services (EVS); Detailed Algorithmic Description", September 2014.
[2] M. Neuendorf, M. Multrus, N. Rettelbach, G. Fuchs, J. Robillard, J. Lecompte, S. Wilde, S. Bayer, S. Disch, C. Helmrich, R. Lefevbre, P. Gournay, et al., "The ISO/MPEG Unified Speech and Audio Coding Standard—Consistent High Quality for All Content Types and at All Bit Rates", *J. Audio Eng. Soc.*, vol. 61, no. 12, pp. 956-977, December 2013.
[3] F. Baumgarte, C. Faller, "Binaural cue coding—Part I: Psychoacoustic fundamentals and design principles," IEEE Trans. Speech Audio Processing, vol. 11, pp. 509-519, November 2003.
[4] Tommy Vaillancourt, "Method and system using a long-term correlation difference between left and right channels for time domain down mixing a stereo sound signal into primary and secondary channels," PCT Application WO2017/049397A1.
[5] 3GPP SA4 contribution S4-170749 "New WID on EVS Codec Extension for Immersive Voice and Audio Services", SA4 meeting #94, Jun. 26-30, 2017, http://www.3qpp.orq/ftp/tsq sa/WG4 CODEC/TSGS4 94/Docs/S4-170749.zip
[6] V. Malenovsky, T. Vaillancourt, W. Zhe, K. Choo and V. Atti, "Two-stage speech/music classifier with decision smoothing and sharpening in the EVS codec," 2015 IEEE International Conference on Acoustics, Speech and Signal Processing (ICASSP), Brisbane, Q L D, 2015, pp. 5718-5722.
[7] T. Vaillancourt and M. Jelinek, "Coding generic audio signals at low bitrates and low delay", U.S. Pat. No. 9,015,038 B2.
[8] K.S. Rao and A.K. Vuppala, Speech Processing in Mobile Environments, Appendix A: MFCC features, Springer International Publishing, 2014
[9] Box, G. E. P. and Cox, D. R. (1964). An analysis of transformations, Journal of the Royal Statistical Society, Series B, 26, 211-252.
[10] D'Agostino, R. and Pearson, E. S. (1973), "Tests for departure from normality", Biometrika, 60, 613-622.
[11] D'Agostino, A. J. Belanger and R. B. D'Agostino Jr., "A suggestion for using powerful and informative tests of normality", American Statistician 44, pp. 316-321, 1990.
[12] I. Jolliffe, Principal component analysis. New York: Springer Verlag, 2002.

What is claimed is:

1. A two-stage speech/music classification device for classifying an input sound signal and for selecting a core encoder for encoding the sound signal, comprising:
at least one processor; and
a memory coupled to the processor and storing non-transitory instructions that when executed cause the processor to implement:
a first stage for classifying the input sound signal into one of a number of final classes, wherein the first stage uses, for classifying the input sound signal, (a) an extractor of features of the input sound signal and (b) an outlier detector for detecting, amongst the extracted features, outlier features based on histograms of the extracted features, and wherein the outlier detector determines a vector of the features as an outlier based on a number of detected outlier features and, instead of discarding the outlier vector, replaces the outlier features in the vector with feature values obtained from at least one previous frame; and
a second stage for extracting additional high-level features of the input sound signal and for selecting the core encoder for encoding the input sound signal in response to the extracted high-level features and the final class selected in the first stage.

2. The two-stage speech/music classification device according to claim 1, wherein the first stage comprises a detector of onset/attack in the input sound signal based on relative frame energy.

3. The two-stage speech/music classification device according to claim 2, wherein the detector of onset/attack updates in every frame a cumulative sum of differences between a relative energy of the input sound signal in a current frame and a relative energy of the input sound signal in a previous frame if the relative energy of the input sound signal in the current frame is larger than the relative energy of the input sound signal in the previous frame.

4. The two-stage speech/music classification device according to claim 3, wherein the detector of onset/attack outputs a binary flag set to a first value if the cumulative sum is located within a given range to indicate detection of an onset/attack and, otherwise, is set to a second value to indicate no detection of onset/attack.

5. The two-stage speech/music classification device according to claim 1, wherein the outlier detector calculates, for each feature, a lower bound and an upper bound, compares a value of the feature with the lower and upper bounds, and marks the feature whose value is lying outside a range defined between the lower and upper bounds as an outlier feature.

6. The two-stage speech/music classification device according to claim 5, wherein the outlier detector calculates the lower and upper bounds using a normalized version of the histogram of the feature, an index of a frequency bin containing a maximum value of the histogram for the feature, and a threshold.

7. The two-stage speech/music classification device according to claim 1, wherein the first stage comprises a non-linear feature vector transformer to transform non-normal features extracted from the input sound signal into features with a normal shape.

8. The two-stage speech/music classification device according to claim 7, wherein the non-linear feature vector transformer uses Box-Cox transformation to transform non-normal features into features with a normal shape, wherein the Box-Cox transformation performed by the non-linear feature vector transformer uses a power transform with an exponent, wherein different values of the exponent define different Box-Cox transformation curves, wherein the non-linear feature vector transformer selects a value of the exponent for the Box-Cox transformation based on a normality test, and wherein the Box-Cox transformation performed by the non-linear feature vector transformer uses a bias to ensure that all input values of the extracted features are positive.

9. The two-stage speech/music classification device according to claim 8, wherein the normality test produces a skew and kurtosis measure, and wherein the non-linear feature vector transformer applies the Box-Cox transformation only to features satisfying a condition related to the skew and kurtosis measure.

10. The two-stage speech/music classification device according to claim 1, wherein the first stage comprises an analyzer of principal components to reduce sound signal feature dimensionality and increase sound signal class discriminability, wherein the analyzer of principal components performs an orthogonal transformation to convert a set of possibly correlated features extracted from the input sound signal into a set of linearly uncorrelated variables forming the principal components.

11. The two-stage speech/music classification device according to claim 1, wherein the first stage comprises a Gaussian Mixture Model (GMM) calculator to determine a first score proportional to a probability that the vector of features extracted from the input sound signal was generated by a speech GMM, and a second score proportional to a probability that the vector of features was generated by a music GMM, wherein the GMM calculator combines the first and second scores by calculating a difference between these first and second scores to produce a differential score.

12. The two-stage speech/music classification device according to claim 11, wherein a negative differential score is indicative that the input sound signal is speech and a positive differential score is indicative that the input sound signal is music.

13. The two-stage speech/music classification device according to claim 11, wherein the GMM calculator uses a decision bias in the calculation of the difference between the first and second scores.

14. The two-stage speech/music classification device according to claim 13, wherein the GMM calculator predicts, in active frames of a training database, labels indicative that the input sound signal is a speech, music or noise signal, and wherein the GMM calculator uses the labels to find the decision bias.

15. The two-stage speech/music classification device according to claim 11, wherein the first stage comprises a state-dependent categorical classifier of the input sound signal into one of three final classes including SPEECH/NOISE, MUSIC and UNCLEAR, wherein the final class UNCLEAR is related to speech with background music.

16. The two-stage speech/music classification device according to claim 15, wherein when, in a current frame, the input sound signal is in an ENTRY state as determined by a state machine, the state-dependent categorical classifier selects one of the three final classes SPEECH/NOISE, MUSIC and UNCLEAR based on a weighted average of the differential scores calculated in frames in the ENTRY state preceding the current frame.

17. The two-stage speech/music classification device according to claim 16, wherein, in states of the input sound signal other than ENTRY as determined by the state machine, the state-dependent categorical classifier selects the final class SPEECH/NOISE, MUSIC or UNCLEAR based on a smoothed version of the differential score and the final class SPEECH/NOISE, MUSIC or UNCLEAR selected in the previous frame.

18. The two-stage speech/music classification device according to claim 17, wherein the state-dependent categorical classifier first initializes the final class in the current frame to the class SPEECH/NOISE, MUSIC or UNCLEAR set in the previous frame, and wherein, in the current frame, the state-dependent categorical classifier transitions from the final class SPEECH/NOISE, MUSIC or UNCLEAR set in the previous frame to another one of the final classes in response to the smoothed differential score crossing a given threshold.

19. The two-stage speech/music classification device according to claim 18, wherein the state-dependent categorical classifier transitions from the final class SPEECH/NOISE set in the previous frame to the final class UNCLEAR if a counter of ACTIVE frames is lower than a first threshold, a cumulative sum of differential frame energy is equal to zero, and the smoothed differential score is larger than a second threshold.

20. The two-stage speech/music classification device according to claim 15, wherein the state-dependent categorical classifier first initializes the final class in the current frame to the class SPEECH/NOISE, MUSIC or UNCLEAR set in a previous frame.

21. The two-stage speech/music classification device according to claim 15, wherein the state-dependent categorical classifier transitions from the final class SPEECH/NOISE set in a previous frame to the final class UNCLEAR if a short pitch flag which is a by-product of an open-loop pitch analysis of the input sound signal is equal to a given value, and a smoothed version of the differential score is larger than a given threshold.

22. The two-stage speech/music classification device according to claim 1, wherein the second stage comprises an extractor of the additional high-level features of the input sound signal in a current frame, and wherein the additional high-level features comprise features selected from the group consisting of:
   (a) tonality of the input sound signal;
   (b) long-term stability of the input sound signal, wherein the extractor of the additional high-level features produces a flag indicative of long-term stability of the input sound signal;
   (c) segmental attack in the input sound signal, wherein the extractor of the additional high-level features produces an indicator of (a) a position of segmental attack in a current frame of the input sound signal or (b) absence of segmental attack; and
   (d) a spectral peak-to-average ratio forming a measure of spectral sharpness of the input sound signal calculated from a power spectrum of the input sound signal.

23. The two-stage speech/music classification device according to claim 1, wherein the second stage comprises a core encoder initial selector for conducting initial selection of the core encoder in response to the extracted high-level features and the final class selected in the first stage, and a refiner of the initial core encoder selection if a GSC core encoder is initially selected by the core encoder initial selector.

24. The two-stage speech/music classification device according to claim 1, wherein the number of final classes comprises a first final class related to speech, a second final class related to music, and a third final class related to speech with background music.

25. The two-stage speech/music classification device according to claim 1, wherein the second stage comprises an extractor of the additional high-level features of the input sound signal in a current frame, and wherein the additional high-level features comprise a tonality of the input sound signal.

26. The two-stage speech/music classification device according to claim 1, wherein the second stage comprises a core encoder initial selector for conducting initial selection of the core encoder using (a) a relative frame energy, (b) the final class in which the input sound signal is classified by the first stage, and (c) the extracted high-level features.

27. A two-stage speech/music classification device for classifying an input sound signal and for selecting a core encoder for encoding the sound signal, comprising:
   at least one processor; and
   a memory coupled to the processor and storing non-transitory instructions that when executed cause the processor to:
      classify, in a first stage, the input sound signal into one of a number of final classes, wherein the first stage, for classifying the input sound signal, (a) extracts features of the input sound signal and (b) detects, amongst the extracted features, outlier features based on histograms of the extracted features, and wherein the detection of outlier features determines a vector of the features as an outlier based on a number of detected outlier features and, instead of discarding the outlier vector, replaces the outlier features in the vector with feature values obtained from at least one previous frame; and
      in a second stage, extract additional high-level features of the input sound signal and select the core encoder for encoding the input sound signal in response to the extracted high-level features and the final class selected in the first stage.

28. A two-stage speech/music classification method for classifying an input sound signal and for selecting a core encoder for encoding the sound signal, comprising:
   in a first stage, classifying the input sound signal into one of a number of final classes, which comprises (a) extracting features of the input sound signal and (b) detecting, amongst the extracted features, outlier features based on histograms of the extracted features, wherein detecting outlier features comprises determining a vector of the features as an outlier based on a number of detected outlier features and, instead of discarding the outlier vector, replacing the outlier features in the vector with feature values obtained from at least one previous frame; and
   in a second stage, extracting additional high-level features of the input sound signal and selecting the core encoder for encoding the input sound signal in response to the extracted high-level features and the final class selected in the first stage.

29. The two-stage speech/music classification method according to claim 28, comprising, in the first stage, detecting onset/attack in the input sound signal based on relative frame energy.

30. The two-stage speech/music classification method according to claim 28, wherein, in the first stage, the extracted features of the input sound signal are selected from the group consisting of:
   (a) an open-loop pitch feature;
   (b) a voicing measure feature;
   (c) a feature related to line spectral frequencies from LP analysis;
   (d) a feature related to residual energy from the LP analysis;
   (e) a short-term correlation map feature;
   (f) a non-stationarity feature;
   (g) a mel-frequency cepstral coefficients feature;
   (h) a power spectrum difference feature; and
   (i) a spectral stationarity feature.

31. The two-stage speech/music classification method according to claim 28, wherein detecting outlier features comprises calculating, for each feature, a lower bound and an upper bound, comparing a value of the feature with the lower and upper bounds, and marking the feature whose value is lying outside a range defined between the lower and upper bounds as an outlier feature.

32. The two-stage speech/music classification method according to claim 28, comprising, in the first stage, non-linear transformation of non-normal features extracted from the input sound signal into features with a normal shape.

33. The two-stage speech/music classification method according to claim 32, wherein the non-linear transformation comprises using Box-Cox transformation to transform non-normal features into features with a normal shape, wherein the Box-Cox transformation comprises using a power transform with an exponent, wherein different values of the exponent define different Box-Cox transformation curves, and selecting a value of the exponent for the Box-Cox transformation based on a normality test, and wherein the Box-Cox transformation comprises using a bias to ensure that all input values of the extracted features are positive.

34. The two-stage speech/music classification method according to claim 33, wherein the normality test produces a skew and kurtosis measure, and wherein the Box-Cox transformation is applied only to features satisfying a condition related to the skew and kurtosis measure.

35. The two-stage speech/music classification method according to claim 28, comprising, in the first stage, analyzing principal components to reduce sound signal feature dimensionality and increase sound signal class discriminability, wherein analyzing principal components comprises an orthogonal transformation to convert a set of possibly correlated features extracted from the input sound signal into a set of linearly uncorrelated variables forming the principal components.

36. The two-stage speech/music classification method according to claim 28, comprising, in the first stage, a Gaussian Mixture Model (GMM) calculation to determine a first score proportional to a probability that the vector of features extracted from the input sound signal was generated by a speech GMM, and a second score proportional to a probability that the vector of features was generated by a music GMM, wherein the GMM calculation comprises combining the first and second scores by calculating a difference between these first and second scores to produce a differential score.

37. The two-stage speech/music classification method according to claim 36, wherein a negative differential score is indicative that the input sound signal is speech and a positive differential score is indicative that the input sound signal is music.

38. The two-stage speech/music classification method according to claim 36, wherein the GMM calculation comprises using a decision bias in the calculation of the difference between the first and second scores.

39. The two-stage speech/music classification method according to claim 38, wherein the GMM calculation predicts, in active frames of a training database, labels indicative that the input sound signal is a speech, music or noise signal, and wherein the GMM calculation comprises using the labels to find the decision bias.

40. The two-stage speech/music classification method according to claim 36, comprising, in the second stage, an initial selection of the core encoder in response to the extracted high-level features and the final class selected in the first stage, and refining the initial core encoder selection if a GSC core encoder is initially selected by the core encoder initial selection.

41. The two-stage speech/music classification method according to claim 40, wherein refining the initial core encoder selection comprises changing an initial selection of a GSC core encoder to a selection of an ACELP core encoder if (a) a ratio of an energy in a number of first frequency bins of a signal segment and a total energy of this signal segment is lower than a first value and (b) a short-term mean of the differential score is higher than a second value.

42. The two-stage speech/music classification method according to claim 40, wherein refining the initial core encoder selection comprises changing, for an input sound signal with short and stable pitch period, an initial selection of a GSC core encoder to (a) a selection of an ACELP core encoder if a smoothed version of the differential score is lower that than a given value or (b) a selection of a TCX core encoder if the smoothed differential score is larger than or equal to the given value.

43. The two-stage speech/music classification method according to claim 40, wherein refining the initial core encoder selection comprises changing an initial selection of a GSC core encoder to (a) a selection of a TCX core encoder in response to long-term stability of the input sound signal and (b) an open-loop pitch larger than a given value.

44. The two-stage speech/music classification method according to claim 40, wherein refining the initial core encoder selection comprises changing, if a segmental attack is detected in the input sound signal, an initial selection of a GSC core encoder to a selection of an ACELP core encoder provided that an indicator that a change of selection of core encoder is enabled has a first value, and a transition frame counter has a second value.

45. The two-stage speech/music classification method according to claim 40, wherein refining the initial core encoder selection comprises changing, if a segmental attack is detected in the input sound signal, an initial selection of a GSC core encoder to a selection of an ACELP core encoder provided that an indicator that a change of selection of core encoder is enabled has a first value, a transition frame counter has not a second value, and an indicator identifying a segment corresponding to a position of the attack in the current frame is larger than a third value.

46. The two-stage speech/music classification method according to claim 28, wherein the number of final classes comprises a first final class related to speech, a second final class related to music, and a third final class related to speech with background music.

47. The two-stage speech/music classification method according to claim 36, comprising, in the first stage, a state-dependent categorical classification of the input sound signal into one of three final classes including SPEECH/NOISE, MUSIC and UNCLEAR, wherein the final class UNCLEAR is related to speech with background music.

48. The two-stage speech/music classification method according to claim 47, wherein when, in a current frame, the input sound signal is in an ENTRY state as determined by a state machine, the state-dependent categorical classification comprises selecting one of the three final classes SPEECH/NOISE, MUSIC and UNCLEAR based on a weighted average of the differential scores calculated in frames in the ENTRY state preceding the current frame.

49. The two-stage speech/music classification method according to claim 48, wherein, in states of the input sound signal other than ENTRY as determined by the state machine, the state-dependent categorical classification comprises selecting the final class SPEECH/NOISE, MUSIC or UNCLEAR based on a smoothed version of the differential score and the final class SPEECH/NOISE, MUSIC or UNCLEAR selected in the previous frame.

50. The two-stage speech/music classification method according to claim 47, wherein the state-dependent categorical classification comprises first initializing the final class in the current frame to the class SPEECH/NOISE, MUSIC or UNCLEAR set in a previous frame.

51. The two-stage speech/music classification method according to claim 47, comprising, in the second stage, extracting the additional high-level features of the input sound signal in a current frame, wherein the additional high-level features comprise features selected from the group consisting of:
   (a) tonality of the input sound signal;
   (b) long-term stability of the input sound signal, wherein extracting the additional high-level features comprises producing a flag indicative of long-term stability of the input sound signal;
   (c) segmental attack in the input sound signal, wherein extracting the additional high-level features comprises producing an indicator of (a) a position of segmental attack in a current frame of the input sound signal or (b) absence of segmental attack; and
   (d) a spectral peak-to-average ratio forming a measure of spectral sharpness of the input sound signal, wherein extracting the additional high-level features comprises calculating the spectral peak-to-average ratio from a power spectrum of the input sound signal.

52. The two-stage speech/music classification method according to claim 51, wherein (a) extracting the tonality of the input sound signal comprises expressing the tonality by a tonality flag reflecting both spectral stability and harmonicity in a lower frequency range of the input sound signal up to a given frequency, (b) extracting the tonality flag comprises (i) calculating the tonality flag using a correlation map forming a measure of signal stability and harmonicity in a number of first frequency bins, in the lower frequency range, of a residual energy spectrum of the input sound signal and calculated in segments of the residual energy spectrum where peaks are present, (ii) applying smoothing of the correlation map and calculating a weighted sum of the correlation map across the frequency bins within the lower frequency range of the input sound signal in the current frame to yield a single number, and (iii) setting the tonality flag by comparing the single number to an adaptive threshold, and (c) the two-stage speech/music classification method comprises, in the second stage, an initial selection of the core encoder using the following conditions:
   (a) if a relative frame energy is higher than a first value, the spectral peak-to-average ratio is higher than a second value, and the single number is higher than the adaptive threshold, a TCX core encoder is initially selected;
   (b) if condition (a) is not present and the final class in which the input sound signal is classified by the first stage is SPEECH/NOISE, an ACELP core encoder is initially selected;
   (c) if conditions (a) and (b) are not present and the final class in which the input sound signal is classified by the first stage is UNCLEAR, a GSC core encoder is initially selected; and
   (d) if conditions (a), (b) and (c) are not present, a TCX core encoder is initially selected.

53. The two-stage speech/music classification method according to claim 28, comprising, in the second stage, extracting the additional high-level features of the input sound signal in a current frame, wherein the additional high-level features comprise a tonality of the input sound signal.

* * * * *